US005837345A

United States Patent [19]

Nishino et al.

[11] Patent Number: 5,837,345

[45] Date of Patent: Nov. 17, 1998

[54] SUPPORT FOR LITHOGRAPHIC PRINTING PLATE, PROCESS FOR THE PREPARATION THEREOF AND ELECTROCHEMICAL ROUGHENING APPARATUS

[75] Inventors: Atsuo Nishino; Akio Uesugi; Hidehito Sasaki; Kiyotaka Fukino; Hirokazu Sakaki; Yoshinori Hotta, all of Shizuoka, Japan

[73] Assignee: Fuji Photo Film Co., Ltd., Kanagawa, Japan

[21] Appl. No.: 611,955

[22] Filed: Mar. 6, 1996

[30] Foreign Application Priority Data

| | | | |
|---|---|---|---|
| Mar. 6, 1995 | [JP] | Japan | 7-045708 |
| Mar. 7, 1995 | [JP] | Japan | 7-047557 |

[51] Int. Cl.$^6$ .............................. B32B 3/00; D06N 7/04; B41N 1/00

[52] U.S. Cl. .......................... 428/141; 428/116; 428/118; 428/156; 428/182; 428/212; 101/453

[58] Field of Search .................................... 428/182, 156, 428/212, 116, 118, 141; 101/453, 459

[56] References Cited

U.S. PATENT DOCUMENTS

| | | | |
|---|---|---|---|
| 4,087,341 | 5/1978 | Takahashi et al. . | |
| 4,301,229 | 11/1981 | Sakaki et al. | 430/158 |
| 4,476,006 | 10/1984 | Ohba et al. | 204/17 |
| 4,919,774 | 4/1990 | Minato et al. . | |
| 4,976,198 | 12/1990 | Ohba et al. | 101/459 |
| 5,328,573 | 7/1994 | Kawasumi et al. . | |
| 5,340,685 | 8/1994 | Sekiya . | |

FOREIGN PATENT DOCUMENTS

| | | |
|---|---|---|
| 0129338 | 12/1984 | European Pat. Off. . |
| 0349983 | 1/1990 | European Pat. Off. . |
| 0387750 | 9/1990 | European Pat. Off. . |
| 0414189 | 2/1991 | European Pat. Off. . |
| 0422682 | 4/1991 | European Pat. Off. . |
| 0595179 | 5/1994 | European Pat. Off. . |
| 0620124 | 10/1994 | European Pat. Off. . |
| 0701908 | 3/1996 | European Pat. Off. . |
| 2019022 | 10/1979 | United Kingdom . |
| 2047274 | 11/1980 | United Kingdom . |

*Primary Examiner*—Donald Loney
*Attorney, Agent, or Firm*—Sughrue, Mion, Zinn, Macpeak & Seas, PLLC

[57] ABSTRACT

A support for a lithographic printing plate having a corrugated surface processed by roughening, wherein the corrugation on the support surface comprises big corrugation having an average pitch of from not less than 5 μm to not more than 30 μm, and middle corrugation superimposed on the big corrugation, the middle corrugation comprising honeycomb pits having an average diameter of from not less than 0.5 to not more than 3.0 μm, and the support surface has a surface inclination distribution which comprises an inclination of not less than 30 degrees in a proportion of from not less than 5% to not more than 20% as determined by an atomic force microscope. A process for the preparation of the support and an electrolytic treatment apparatus for the process are also described.

2 Claims, 6 Drawing Sheets

SUPPORT FOR LITHOGRAPHIC PRINTING PLATE, PROCESS FOR THE PREPARATION THEREOF AND ELECTROCHEMICAL ROUGHENING APPARATUS

FIELD OF THE INVENTION

The present invention relates to a support for lithographic printing plate, a process for the preparation thereof, and an apparatus for use in the preparation process.

BACKGROUND OF THE INVENTION

As an aluminum support for lithographic printing plate there may be commonly used a rolled plate made of a material defined in JIS A1050, A1100, A3008 or the like having a thickness of about from 0.1 to 0.6 mm. Such an aluminum support is prepared by a semi-continuous casting process (DC casting). Furthermore, JP-A-5-156414 (The term "JP-A" as used herein means an "unexamined published Japanese patent application") discloses a process which comprises double roll continuous casting, annealing before or after cold rolling, and then roughening.

The foregoing DC casting process for the preparation of an aluminum alloy requires a complicated procedure and a prolonged treatment process, inevitably raising the manufacturing cost. To solve this problem, an invention comprising the use of an aluminum support obtained by continuous casting and rolling as a support for lithographic printing plate has been applied for patent. However, this approach is disadvantageous in that the aluminum support is highly liable to adverse effects of continuous casting and rolling, that is, a nonuniform layer present on the surface of the casted aluminum support is still present on the surface of the rolled aluminum support, causing nonuniformity in electrolytic roughen ability, external appearance after treatment, etc.

The lithographic printing is a printing process utilizing the property that water and oil are essentially immiscible with each other. On the printing surface of the lithographic printing plate regions that accepts water but repels an oil ink (hereinafter referred to as "non-image areas") and regions that accepts an oil ink but repels water (hereinafter referred to as "image areas") are formed. The aluminum support adapted for lithographic printing plate is used in such an arrangement that its surface retains the non-image areas. Therefore, the aluminum support is required to have various conflicting properties, i.e., excellent hydrophilicity, excellent water receptivity, excellent adhesion property to a light-sensitive layer provided thereon, etc. If the support has a low hydrophilicity, the ink can stick to the non-image areas during printing, causing so-called background stain. If the support has a low receptivity, jamming occurs at the shadow area unless a large amount of a fountain solution is used during printing. This makes narrow the addition amount range of the fountain solution within which printing is suitably carried out.

In order to obtain an aluminum support excellent in these properties, the surface of an aluminum is generally grained to have a fine roughness. Known examples of a graining method include mechanical roughening methods such as a ball graining, a brush graining, a wire graining and a blast graining, an electrolytic roughening method which comprises electrolytic etching of an aluminum web in an electrolyte containing hydrochloric acid and/or nitric acid, and a composite roughening method comprising a mechanical roughening method combined with an electrolytic roughening method as described in U.S. Pat. No. 4,476,006.

Advantageous among these graining methods are a brush graining method and a combined method of a brush graining method and an electrolytic roughening method because they can provide a support for lithographic printing plate having excellent properties, and exhibit an excellent mass-producibility.

The brush for use in the brush graining process normally comprises one or a plurality of brushes. JP-B-50-40047 (The term "JP-B" as used herein means an "examined Japanese patent publication") describes that a plurality of brushes of one kind are used. JP-A-6-135175 (The term "JP-A" as used herein means an "unexamined published Japanese patent application") describes that a plurality of brushes having different bristle materials, bristle diameters and bristle sections can be used.

With respect to the electrolytic roughening, European Patent No. 0595179A (which corresponds to JP-A-6-135175) describes that a sinusoidal wave, trapezoidal wave or square wave is used as the alternating current for use in the electrochemical roughening process.

JP-A-5-195300 describes that as the electrolytic cell for use in the electrochemical roughening process there may be used a radial cell, and an auxiliary anode may be provided in the same cell as for the main electrodes. Furthermore, U.S. Pat. No. 4,919,774 (which corresponds to JP-B-6-37716) describes that a current is shunted as a direct current to an auxiliary anode provided in a separate cell from that for the two main electrodes.

However, these methods are liable to staining on the shadow areas and the blanket and can hardly provide a support for lithographic printing plate having a good adhesion to the light-sensitive layer.

SUMMARY OF THE INVENTION

Therefore, an object of the present invention is to provide a process for the preparation of a support for lithographic printing plate which provide a support having a stable surface-treatability and external appearance from an aluminum web obtained by a continuous casting and rolling process which production procedure can be simplified.

Another object of the present invention is to provide a support for lithographic printing plate which causes no staining on shadow areas and a blanket and has a good adhesion property to the light-sensitive layer.

A further object of the present invention is to provide a process for the preparation of the above described support, an electrochemical roughening apparatus for use in the process, and a photosensitive lithographic printing plate prepared from the above described support.

The above described objects of the present invention has been achieved by providing:

a support for a lithographic printing plate having a corrugated surface processed by roughening, wherein the corrugation on the support surface comprises big corrugation having an average pitch of from not less than 5 $\mu$m to not more than 30 $\mu$m, and middle corrugation superimposed on the big corrugation, the middle corrugation comprising honeycomb pits having an average diameter of from not less than 0.5 to not more than 3.0 $\mu$m, the support surface has a surface inclination distribution which comprises an inclination of not less than 30 degrees in a proportion of from not less than 5% to not more than 20% as determined by an atomic force microscope;

a process for the preparation of a support for a lithographic printing plate from a continuous cast-rolled aluminum web, which comprises electrochemically roughening the surface of the aluminum web in an acidic aqueous solution with a trapezoidal alternating current having a zero-to-peak time of from 1 to 3 msec and a frequency of from 50 to 70 Hz to effect roughening with removing a nonuniform surface layer present on the web surface which is caused by the casting;

a process for the preparation of a support for a lithographic printing plate from a continuous cast-rolled aluminum web, which comprises the following steps in the order named:

(a) mechanically roughening the surface of the aluminum web by a rotary nylon brush roller having a bristle diameter of from 0.2 mm to 0.9 mm with a slurry supplied onto the surface of the aluminum web;

(b) etching the mechanically roughened surface in an alkaline aqueous solution so that a dissolution amount of the aluminum web is from not less than 1 $g/m^2$ to not more than 30 $g/m^2$;

(c) desmutting said etched surface in an acidic aqueous solution;

(d) electrochemically roughening the surface of the aluminum web in an acidic aqueous solution with a trapezoidal alternating electric current having a zero-to-peak time of from 1 to 3 msec and a frequency of from 50 to 70 Hz;

(e) etching said electrochemically roughened surface in an alkaline aqueous solution so that a dissolution amount of said aluminum web is from not less than 0.1 $g/m^2$ to not more than 3 $g/m^2$;

(f) desmutting said etched surface in an acidic aqueous solution; and (g) anodizing said desmutted surface to form an anodized film on said aluminum web; and a continuous electrolytic treatment apparatus for continuous electrolysis of a metal web with an electric current supplied from a power source through an electrolyte, which comprises (a) a radial electrolytic cell having two main electrode to which an alternating electric current is supplied, (b) an auxiliary anode cell having an auxiliary anode and (c) a rectifying element or switching element being arranged for shunting said alternating electric current from the power source to said auxiliary anode with converting into a direct current to control the ratio of a current value contributing to an anode current acting on the surface of the aluminum web opposed to the main electrodes to a current value contributing to a cathode reaction.

BRIEF DESCRIPTION OF THE DRAWINGS

FIG. 9(*b*) is a top view of an embodiment of the auxiliary anode cell according to the present invention.

FIG. 9(*c*) is a top view of an embodiment of the auxiliary anode cell according to the present invention.

DETAILED DESCRIPTION OF THE INVENTION

Figure 1:
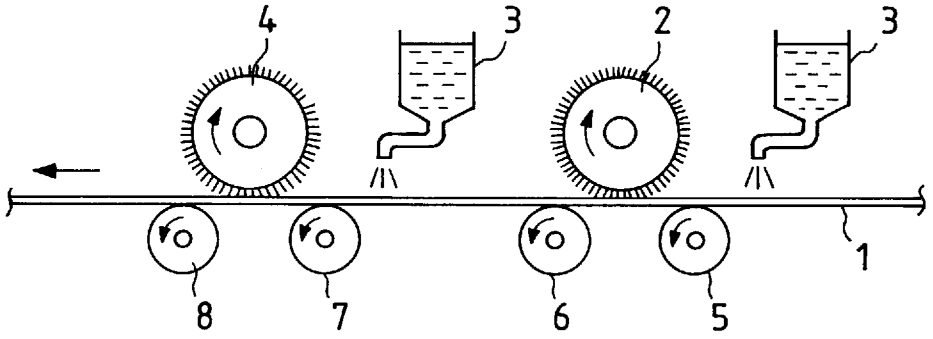
FIG. 1 is a side view of an embodiment of the mechanical roughening apparatus according to the present invention.

In the present invention, the support for lithographic printing plate having a corrugated surface formed by roughening. The corrugation on the support surface comprises big corrugation having an average pitch of from not less than 5 μm to not more than 3.0 μm, and middle corrugation superimpose on the big corrugation. The middle corrugation comprises honeycomb pits having an average diameter of from not less than 0.5 μm to not more than 3.0 m. If the big corrugation has a pitch of less than 5 μm, resulting lithographic printing plate has a marked gloss and hence a reduced detectability. On the contrary, if the big corrugation has a pitch of more than 30 μm, it tends to reduce the maximum printable number of sheets.

On the big corrugation, honeycomb pits having an average diameter of from not less than 0.5 μm to not more than 3 μm, preferably from not less than 0.5 μm to not more than 1 μm, are formed. The honeycomb pits are preferably formed uniformly over the entire surface of the support. If the pit diameter falls below 0.5 μm or exceeds 3 μm, it worsens the stainproofness of the blanket. Pits having a density of from $1\times10^5$ to $6\times10^6/mm^2$ are preferably formed uniformly over the entire surface of the big corrugation. If the honeycomb pits are not formed uniformly over the entire surface of the big corrugation, it worsens the stainproofness with a special ink such as gold ink. The electrical quantity required for the formation of the optimum number of honeycomb pits depends on the honeycomb pit diameter and can be properly determined.

The electrochemical roughening may be followed by a chemical etching in an alkaline aqueous solution as described in JP-A-56-47041 so that the smut component produced by the electrochemical roughening and the edge of the honeycomb pits are dissolved away to obtain a printing plate having a good stainproofness.

The atomic force microscope (AFM) used in the measurement of the present invention was SPI3700 produced by Seiko Instrument Inc. In measurement, a 1 cm square aluminum specimen was set on a horizontal specimen table on a piezoelectric scanner. A cantilever was then allowed to approach the surface of the specimen. Once the cantilever reached a region where an interatomic force can act on, it was moved in X and Y directions to scan the surface of the specimen and pick up the surface irregularity as a piezoelectric displacement in Z direction. As the piezoelectric scanner there was used one which can scan over 150 μm in X and Y directions and 10 μm in Z direction. As the cantilever there was used SI-DF20 produced by NANOPOROBE CORP., which has a resonant frequency of from 120 kHz to 150 kHz and a spring constant of 12 to 20 N/m. The measurement was conducted in DFM mode (Dynamic Force Mode). The three-dimensional data thus obtained were then approximated by the least squares method to correct the slight inclination of the specimen and determine the reference surface.

In the measurement of the pitch of big corrugation, the average surface roughness and the angle of inclination, measurement was made on a 120 μm square area over four fields of view, i.e., on a 240 μm square area. The resolving power in each of X and Y directions was 1.9 μm, the resolving power in Z direction was 1 nm, and the scanning speed was 60 μm/sec. The pitch of the big corrugation was calculated by the frequency analysis of the three-dimensional data. The average surface roughness (Ra) was determined according to the center line average roughness defined in JIS B0601 (1994) by extending to three-dimensional data. For the evaluation of the surface inclination, three adjoining points were extracted from the three-dimensional data. The angle of the minute triangle formed by the three points with the reference surface was calculated over all the data to determine a distribution of inclination angles from which the proportion of surfaces having an inclination angle of not less than 30 degrees was then determined.

For the evaluation of the pit diameter of the middle corrugation, measurement was made on a 25 μm square area over four fields of view, i.e., on a 50 μm square area. The resolving power in each of X and Y directions was 0.1 μm, the resolving power in Z direction was 1 nm, and the scanning speed was 25 μm/sec. The diameter of the pit was measured at the edge thereof.

In the present invention, the preferred average surface roughness determined by AFM is from 0.5 μm to 1.0 μm, more preferably from 0.5 μm to 0.8 μm. If the average surface roughness falls below 0.5 μm, the printing plate can be easily stained on the non-dot image areas. On the contrary, if the average surface roughness exceeds 1.0 μm, the non-image areas can be easily stained on the blanket.

In the present invention, the proportion of the surface having an inclination angle of not less than 30 degrees in the distribution of surface inclination determined by AFM is from not less than 5% to not more than 20%, preferably from not less than 5% to not more than 15%. If the proportion falls below 5%, the printing plate can be easily stained on the non-dot image areas. On the contrary, if the proportion exceeds 20%, the non-image areas can be easily stained on the blanket.

The process for the preparation of the aluminum support for lithographic printing plate of the present invention is described in detail below. The aluminum web for use in the present invention is a casted and rolled aluminum web prepared by a continuous cast-rolling process. Examples of the aluminum web include pure aluminum web, alloy web comprising aluminum as a main component and a slight amount of different elements, and plastic film web laminated or metallized with aluminum.

Examples of the different elements may be contained in the aluminum alloy include silicon, iron, manganese, copper, magnesium, chromium, zinc, bismuth, nickel and titanium. The content of the different elements in the alloy is generally not more than 10% by weight.

The aluminum web which can be preferably used in the present invention consists of pure aluminum. Since completely pure aluminum can be hardly prepared from the standpoint of refining technique, an aluminum web comprising a slight amount of different elements may be used in the present invention. Thus, the aluminum web for use in the present invention is not limited in its composition. Known materials which have been commonly used, such as those described in JIS A1050, JIS A1100, JIS A3103, JIS A3004 and JIS A3005, can be properly used.

The thickness of the aluminum web for use in the present invention is generally from about 0.1 mm to 0.6 mm.

Examples of the continuous cast-rolling process for use in the present invention include a double roll method, a belt-caster method and a block caster method.

Examples of a graining (roughening) method for use in the present invention include an electrochemical graining method which comprises electrochemical graining in a hydrochloric acid or nitric acid electrolyte; and mechanical graining methods such as a wire brush graining method which comprises scratching the surface of an aluminum web with a metal wire, a ball graining method which comprises graining the surface of aluminum with an abrasive ball and an abrasive, and a brush graining method which comprises graining the surface of aluminum with a nylon brush and an abrasive. These graining methods may be used alone or in combination of two or more thereof.

Prior to being brush-grained, the aluminum web is optionally subjected to degreasing treatment for the removal of rolling oil from the surface thereof, such as degreasing treatment with a surface active agent, organic solvent or alkaline aqueous solution. However, if little rolling oil is attached to the surface of the aluminum web, the degreasing treatment can be omitted. Subsequently, the aluminum web is brush-grained by one kind of a brush or at least two kinds of brushes having different bristle diameters with supplying an abrasive slurry onto the surface thereof. The brush which is first used in the brush graining process is called 1st brush, and the brush which is finally used is called 2nd brush. As shown in FIG. 1, brushe rollers 2 and 4 and two pairs of supporting rollers 5,6 and 7,8 are disposed so as to clamp an aluminum web 1 during graining. The minimum distance between the outer surface of the supporting rollers 5 and 6 and between the outer surface of the supporting rollers 7 and 8 are each arranged to be less than the outer diameter of the brushe rollers 2 and 4, respectively. The aluminum web 1 is preferably carried at a constant speed while being pressed into the gap between the supporting rollers 5 and 6 and between the supporting rollers 7 and 8 under the brushe rollers 2 and 4, respectively. During this process, the brushe rollers are rotated with an abrasive slurry 3 being supplied onto the surface of the aluminum web 1 so that the surface of the aluminum web 1 is grained.

As the brush roller for use in the present invention there may be preferably used a brush comprising a roller element filled with brush bristles such as nylon bristle, polypropylene bristle, animal hair and steel wire at a predetermined length in a predetermined distribution; a brush comprising such a roller element filled with bundles of brush bristles in small holes made thereon; or a channel roller type brush. Preferred among these brush bristles is nylon. The length of the bristles thus planted is preferably from 10 mm to 200 mm. The planted bristle density on the brush roller is preferably from 30 to 1,000, more preferably from 50 to 300 per $cm^2$.

The preferred bristle diameter is from 0.2 mm to 0.9 mm, preferably from 0.24 mm to 0.83 mm, more preferably from 0.295 mm to 0.72 mm. The section of the bristle is preferably circular. If the bristle diameter falls below 0.24 mm, it worsens the stainproofness on the shadow areas. On the contrary, if the bristle diameter exceeds 0.9 mm, it worsens the stainproofness on the blanket. The bristle material is preferably nylon. For example, nylon 6, nylon 6•6, nylon 6•10, etc. may be used. Most preferred among these nylons is nylon 6•10 in the light of tensile strength, abrasion resistance, dimensional stability against moisture, bending strength, heat resistance and recovery.

The number of brushes is preferably from not less than 1 to not more than 10, more preferably from not less than 1 to not more than 6. As described in JP-A-6-135175, brush rollers having different bristle diameters may be used in combination.

The rotational speed of the brush roller is preferably from 100 rpm to 500 rpm. As the supporting roller there may be used one having a rubber or metal surface which can maintain a good straightness. The direction of rotation of the brush roller is preferably forward to follow the moving direction of the aluminum web as shown in FIG. 1. In the case where a plurality of brush rollers are provided, some of these brush rollers may be rotated against moving direction of the aluminum web.

In the present invention, the aluminum web which has been roughened by the thick brush is preferably treated by a fine brush to obtain a support which satisfies all the requirements for hydrophilicity, water retention and adhesion. In this case, the collapse of shadow area which would occur if a small amount of fountain solution is used does not occur. As a result, the addition amount range of the fountain solution within which printing is suitably carried out is enlarged. Furthermore, background stain can hardly occur. Moreover, the adhesion to the light-sensitive layer is not deteriorated. Furthermore, the present invention provides an effect of decreasing dot gain during printing, though its mechanism being unknown. The abrasive slurry for use in the present invention preferably comprises an abrasive such as siliceous sand, aluminum hydroxide, iron oxide, magnesium oxide, alumina powder, volcanic ash, Carborundum, quartz and emery having an average particle diameter of from 15 to 35 $\mu$m dispersed in water preferably in an amount of from 10 to 70% by weight. Of the above described abrasive, siliceous sand, aluminum hydroxide, aluminum oxide, iron oxide, magnesium oxide are preferred, and siliceous sand and aluminum hydroxide are particularly preferred. The aluminum support according to the present invention is preferably treated in such a manner that the average surface roughness (Ra) is from 0.5 to 1.0 $\mu$m as determined by an atomic force microscope (AFM).

The aluminum web which has been thus brush-grained is then preferably subjected to chemical etching on the surface thereof. This chemical etching process acts to remove an abrasive, aluminum chips, etc. caught by the aluminum web thus brush-grained, making it possible to uniformly and effectively conduct the subsequent electrochemical roughening.

Such a chemical etching process is further described in U.S. Pat. No. 3,834,398. In some detail, this is a process which comprises dipping aluminum in a solution capable of dissolving aluminum, specifically an aqueous solution of an acid or base. Examples of the foregoing acid include sulfuric acid, persulfuric acid, hydrofluoric acid, phosphoric acid, nitric acid and hydrochloric acid. If an acid is used as an etchant, it takes much time to destroy the fine structure, giving a disadvantage in the industrial application of the present invention. This disadvantage can be eliminated by the use of an aqueous alkaline solution of a base as an etchant. Since the aqueous alkaline solution gives a high etching rate, it is preferably used in chemical etching for use in the present invention. Examples of the foregoing base include sodium hydroxide, potassium hydroxide, sodium tertiary phosphate, potassium tertiary phosphate, sodium aluminate, sodium metasilicate, sodium carbonate, caustic soda and lithium hydroxide. The chemical etching is preferably effected in an aqueous alkaline solution of the base having a concentration of from 0.05 to 50% by weight, preferably from 1 to 40% by weight, at a liquid temperature of from 20 to 100° C., preferably from 40° C. to 100° C., for from 5 to 300 seconds.

The chemically etched amount of the aluminum web is preferably from 1 to 30 g/m$^2$, more preferably from 4 to 30 g/m$^2$. The optimum etched amount of the aluminum web changes depending on the kind of abrasive used in brush graining, the diameter of bristle in the brush, the rotational speed, the direction of rotation, the pressing force of the brush (proportional to the electric power consumed by the rotary driving motor for the brush when the brush is pressed against the aluminum web), or combination thereof.

Particularly preferred among the foregoing abrasives are siliceous sand and aluminum hydroxide. When an rounded abrasive such as aluminum hydroxide is used, a good printing plate can be obtained even if the etched amount after mechanical roughening is low as compared with the use of siliceous sand as an abrasive.

Aluminum hydroxide to be used as an abrasive can be obtained by a crystallization method. If the waste water from the surface treatment of the aluminum web is used to prepare such an abrasive, the treatment flowing system can be closed, giving an advantage in cost and environmental protection.

The pressing force of the brush is preferably from 2.5 to 15 kw, more preferably from 4 to 10 kw as calculated in terms of electric power consumed by the rotary driving motor.

If the foregoing chemical etching is effected in an aqueous solution of base, smut is generally formed on the surface of the aluminum web. If this happens, the aluminum web is then preferably subjected to so-called desmutting treatment, i.e., treatment with phosphoric acid, nitric acid, sulfuric acid, chromic acid, phosphoric acid, hydrofluoric acid, borofluoric acid, or a mixed acid containing two or more of thereof.

The desmutting time is preferably from 1 to 30 seconds. The liquid temperature is from ordinary temperature to 70° C.

The desmutting treatment before the electrochemical roughening can be omitted. In the desmutting treatment, the overflow electrolyte from the electrochemical roughening process can be used. In this case, the rinsing process after desmutting treatment can be omitted. However, the aluminum web needs to be treated while it is wet so that the aluminum web is prevented from being dried in order to evade the deposition of a component in the desmutting solution.

Subsequently, the surface of the aluminum web is electrochemically roughened. The electrochemical roughening is effected in a hydrochloric acid or nitric acid electrolyte with an alternating electric current. As described in JP-A-54-63902, the two acids may be used in combination. The concentration of hydrochloric acid or nitric acid is preferably from 0.01 to 3% by weight, more preferably from 0.05 to 2.5% by weight.

The electrolyte may optionally further comprise a corrosion inhibitor (or stabilizer) such as nitrates, chlorides, monoamines, diamines, aldehydes, phosphoric acid, chromic acid, boric acid and aluminum oxalate, grain uniformizing agent, etc.

The electrolyte may contain aluminum ions in a proper amount (1 to 10 g/l). The electrolyte temperature is generally from 10° C. to 60° C.

Subsequently, the aluminum web is preferably subjected to a.c. electrolytic roughening in an acidic electrolyte such as hydrochloric acid and nitric acid at an anodizing current density of from 10 to 60 $A/cm^2$ with an anodizing electrical quantity of from 100 to 400 $C/dm^2$. The electric current used herein is preferably an alternating current obtained by alternating positive and negative polarities.

As the alternating current for use in the present invention there may also be used sinusoidal single-phase or three-phase alternating electric current, trapezoidal current, or square current. Such an electrolytic roughening process is described in detail in U.S. Pat. No. 4,087,341.

The ratio (Qc/Qa) of the anodizing electrical quantity Qc to the cathodic electrical quantity Qa, the anodizing current density and the anodizing electrical quantity can be controlled to make a grain composed of pits having an average diameter of from 0.5 to 3.0 μm and a density of from $1\times10^5/mm^2$ to $6\times10^6/mm^2$ formed on the entire surface of the aluminum web. The anodizing electrical quantity is generally from 100 to 400 $C/dm^2$ as described above, preferably from 150 to 300 $C/dm^2$. If the anodizing electrical quantity falls below 100 $C/dm^2$, pits cannot be formed on the entire surface of the aluminum web, causing the deterioration of water retention and printing durability. On the contrary, if the anodizing electrical quantity exceeds 400 $C/dm^2$, pits having a larger diameter are ununiformly formed and the number of pits thus formed falls below $1\times10^5/mm^2$, causing the deterioration of water retention. On the other hand, the anodizing current density is generally from 10 to 60 $A/dm^2$, preferably from 20 to 50 $A/dm^2$. If the anodizing current density falls below 10 $A/dm^2$, the treatment time is prolonged. It may result in causing manufacturing problems or making it impossible to form pits on the entire surface of the aluminum web. On the contrary, if the anodizing current density exceeds 60 $A/dm^2$, the resulting pits have ununiform diameters, causing the deterioration of water retention that makes it impossible to attain the effects of the present invention. Furthermore, Qc/Qa ratio is preferably from 0.75 to 0.95.

Figure 2:
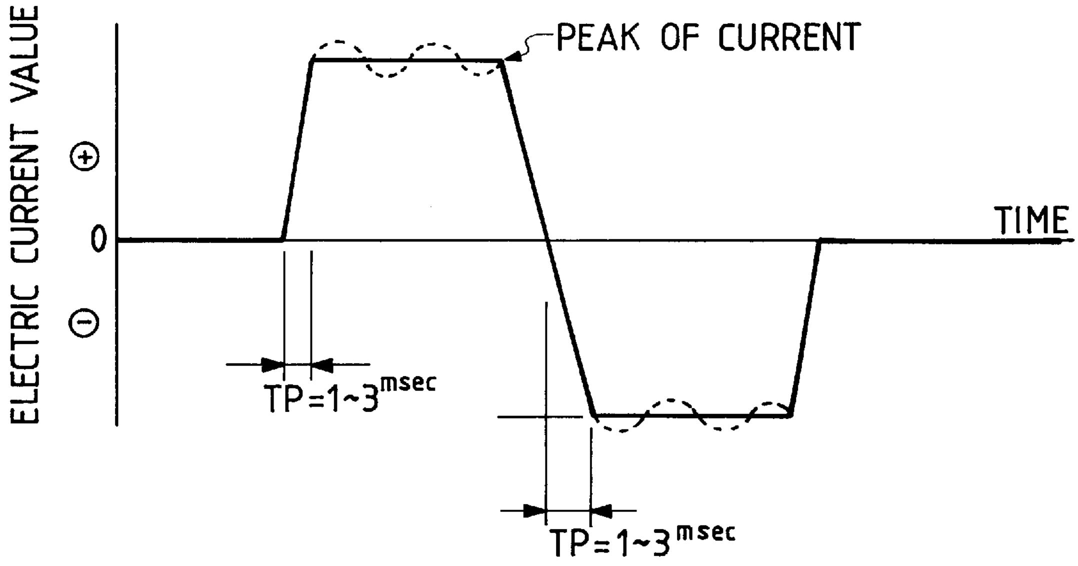
FIG. 2 is an embodiment of the waveform of the alternating electric current for use in the electrochemical roughening process according to the present invention.

The trapezoidal wave current preferably used in the electrochemical roughening process of the present invention is as shown in FIG. 2. The time (TP; zero-to-peak time) required until the electric current reaches its peak from zero is preferably from 1 to 3 msec. If TP falls below 1 msec., uneven treatment called chatter mark which occurs perpendicular to the moving direction of the aluminum web can be easily generated. On the contrary, if TP exceeds 3 msec., the treatment can be easily affected by trace amounts of components which are spontaneously increased during the electrolysis in a nitric acid solution, such as ammonium ion in the electrolyte used in the electrochemical roughening, making it difficult to conduct uniform graining. This results in deterioration in stainproofness.

The duty ratio of the trapezoidal wave current may be from 1:2 to 2:1. In the indirect electrical supply system free of conductor roll as described in JP-A-5-195300, the duty ratio is preferably from 1:1.

The frequency of the trapezoidal alternating current is preferably from 50 Hz to 70 Hz. If it falls below 50 Hz, the carbon electrode as a main electrode can be easily dissolved. On the contrary, if it exceeds 70 Hz, the treatment can be easily affected by the inductance component of the power supply circuit, thereby raising the power supply cost.

The aluminum web which has been subjected to the foregoing electrolytic roughening is preferably again chemically etched with a base. This etching may be effected in the same manner as in the foregoing dipping in an aqueous alkaline solution of a base. The foregoing base such as sodium hydroxide may be used. The etched amount in this chemical etching is from 0.1 to 3 $g/m^2$. If the etched amount falls below 0.1 $g/m^2$, the protrusion between the pits cannot be dissolved away, making it impossible to give a edgeless gentle structure and hence making the printing plate liable to background stain. On the contrary, if the etched amount exceeds 3 $g/m^2$, the pits obtained by the electrolytic roughening disappear, presenting problems of water retention, etc. The concentration of the above described base used as an etching agent is preferably from 0.05 to 50% by weight. The etching temperature is preferably from 40° C. to 100° C. The etching time is preferably from 1 second to 100 seconds.

This chemical etching with a base is preferably followed by a desmutting treatment with phosphoric acid, nitric acid, sulfuric acid, chromic acid or the like. The desmutting treatment is generally carried out in the same manner as in the desmutting treatment before the electrochemical roughening.

Preferred examples of desmutting treatment after the electrochemical roughening process include a method which comprises bringing the aluminum web into contact with sulfuric acid having a concentration of from 15 to 65% by weight at a temperature of 50° C. to 90° C. as described in JP-A-53-12739.

The aluminum web which has thus been treated may be used as a support for a lithographic printing plate. It may be further subjected to treatment such as anodization and formation. In order to enhance the water retention or abrasion resistance of the surface of the aluminum web, the aluminum web is preferably subjected to anodization. As the electrolyte for use in the anodization of the aluminum web there may be used any electrolyte which can form a porous oxide film. In general, sulfuric acid, phosphoric acid, oxalic acid, chromic acid, sulfamic acid, benzenesulfonic acid or a mixed acid comprising two or more thereof may be used. The concentration of such an electrolyte is appropriately determined depending on the kind of the electrolyte. The anodization conditions vary with the kind of the electrolyte used and cannot be unequivocally defined. In general, the electrolyte concentration is preferably from 1 to 80% by weight, the liquid temperature is preferably from 5° C. to 70° C., the current density is generally from 0.5 to 60 $A/dm^2$, preferably from 1 to 60 $A/dm^2$, the voltage is preferably from 1 to 100 V, and the electrolysis time is generally from 10 to 100 seconds, preferably from 10 seconds to 5 minutes.

The sulfuric acid process is generally effected with direct current but may be effected with an alternating current. The concentration of sulfuric acid to be used is generally from 5% to 30% by weight. The electrolysis is generally effected at a temperature of from 20° C. to 60° C. for 5 seconds to 250 seconds. The electrolyte to be used preferably contains aluminum ion. The current density during the electrolysis is preferably from 1 to 20 $A/dm^2$.

In the case of phosphoric acid process, the concentration of phosphoric acid to be used is generally from 5 to 50%. The electrolysis is generally effected at a temperature of from 30° C. to 60° C. and a current density of from 1 to 15 $A/dm^2$ for 10 seconds to 300 seconds. The amount of the film formed by the anodization is preferably not less than 1.0 $g/m^2$, more preferably from 2.0 to 6.0 $g/m^2$.

If the amount of the film formed by the anodization falls below 1.0 $g/m^2$, the printing plate thus prepared exhibits insufficient printing durability or is liable to scratch on the non-image areas, causing so-called "scratch stain", i.e., the attachment of an ink to scratch during printing.

Particularly preferred among these anodization treatment processes are a method which comprises anodization in sulfuric acid at a large current density as used in British Patent 1,412,768 and a method which comprises anodization in phosphoric acid as an electrolytic bath as described in U.S. Pat. No. 3,511,661.

The aluminum web which has thus been anodized is then subjected to hydrophilic treatment, if necessary. As the hydrophobic treatment for use in the present invention include an alkaline metal silicate (e.g., aqueous solution of sodium silicate) process as disclosed in U.S. Pat. Nos. 2,714,066, 3,181,461, 3,280,734, and 3,902,734. In this process, the support is dipped or electrolyzed in an aqueous solution of sodium silicate. Besides such a process, the treatment with potassium fluorozirconate as disclosed in JP-B-36-22063 or a polyvinylsulfonic acid as disclosed in U.S. Pat. Nos. 3,276,868, 4,153,461, and 4,689,272 may be used.

The aluminum web which has been grained and anodized is also preferably subjected to sealing. The sealing treatment is effected by dipping the aluminum web in hot water or a hot aqueous solution containing an inorganic or organic salt, or by placing the aluminum web in a steam bath.

On the support for lithographic printing plate thus obtained can be provided a known photosensitive layer to obtain a photosensitive lithographic printing plate. The lithographic printing plate obtained by processing the photosensitive lithographic printing plate exhibits excellent properties. The photosensitive substance for use in the photosensitive layer is not specifically limited. Photosensitive substances which are commonly used in photosensitive lithographic printing plates, such as various photosensitive substances described in JP-A-6-135175, can be used.

Prior to being coated with the light-sensitive layer, the aluminum web may be optionally provided with an organic undercoat layer. As the organic undercoat layer to be used as an undercoat layer there may be used a known material such as those described in JP-A-6-135175.

Preferred embodiments of the undercoat layer and the photosensitive layer are described below in detail.

Examples of an organic compound for use in the organic undercoat layer include carboxymethyl cellulose, dextrin, gum arabic, phosphonic acids having an amino group such as 2-aminoethylphosphonic acid, organic phosphonic acids such as phenylphosphonic acid, naphthylphosphonic acid, alkylphosphonic acid, glycerophosphonic acid, methylenediphosphonic acid and ethylenediphosphonic acid each of which may optionally contain a substituent, organic phosphoric acids such as phenylphosphinic acid, phenylphosphoric acid, naphthylphosphoric acid, alkylphosphoric acid and glycerophosphoric acid each of which may optionally contain a substituent, organic phosphinic acids such as naphthylphosphinic acid, alkylsulfinic acid and glycerophosphinic acid, amino acids such as glycine and β-alanine, and hydrochloric acid salts of amine having a hydroxyl group such as hydrochloric acid salt of triethanolamine. Two or more of these organic compounds may be used in admixture.

The foregoing organic undercoat layer may be provided in the following manner. In some detail, a method which comprises applying to the aluminum web a solution of the foregoing organic compound in water or an organic solvent such as methanol, ethanol and methyl ethyl ketone or mixture thereof, and then drying the coating to form an organic undercoat layer, or a method which comprises dipping the aluminum web in a solution of the foregoing organic compound in water or an organic solvent such as methanol, ethanol and methyl ethyl ketone or mixture thereof so that the organic compound is absorbed by the aluminum web, washing the aluminum web with water or the like, and then drying the aluminum web to form an organic undercoat layer may be employed. In accordance with the former method, a solution of the foregoing organic compound having a concentration of from 0.005 to 10% by weight can be applied in various manners. For example, any of bar coating method, roller coating method, spray coating method and curtain coating method may be used. In the latter method, the concentration of the coating solution is generally from 0.01 to 20% by weight, preferably from 0.05 to 5% by weight, the dipping temperature is from 20° C. to 90° C., preferably from 25° C. to 50° C., and the dipping time is from 0.1 seconds to 20 minutes, preferably from 2 seconds to 1 minute.

The pH value of the solution for use in the foregoing coating process may be adjusted to from 1 to 12 with a basic substance such as ammonia, triethylamine and potassium hydroxide or an acidic substance such as hydrochloric acid and phosphoric acid. Furthermore, the solution may comprise a yellow dye incorporated therein to improve tone reproducibility of the resulting photosensitive lithographic printing plate.

The optimum dried coated amount of the organic undercoat layer is from 2 to 200 $mg/m^2$, preferably from 5 to 100 $mg/m^2$. If the coated amount falls below 2 $mg/m^2$, sufficient printing durability cannot be provided. On the contrary, if the coated amount exceeds 200 $mg/m^2$, the same problem arises.

As the photosensitive composition for use in the photosensitive layer of the present invention there may be used a positive working photosensitive composition comprising an o-quinonediazide compound as a main component or a negative working photosensitive composition comprising as a photosensitive material a photopolymerizable compound containing a diazonium salt, alkali-soluble diazonium salt or unsaturated double bond-containing monomer as a main component, or a photo-crosslinkable compound containing cinnamic acid or dimethyl maleimide.

Furthermore, electrophotographic photosensitive layers as described in JP-B-37-17172, JP-B-38-6961, JP-A-56-107246, JP-A-60-254142, JP-B-58-36259, JP-B-59-25217, JP-A-56-146145, JP-A-62-194257, JP-A-57-147656, JP-A-58-100862, and JP-A-57-161863 may be used in the present invention.

Among the foregoing photosensitive materials, examples of the photopolymerizable compound comprising as a main component an unsaturated double bond-containing monomer include a composition comprising an addition-polymerizable unsaturated compound terminated by two or more ethylene groups and a photopolymerization initiator as described in U.S. Pat. Nos. 2,760,863 and 3,060,023, and JP-A-59-53836.

Examples of the negative working photosensitive material comprising a photo-crosslinkable compound containing dimethyl maleimide group include photosensitive materials described in JP-A-52-988, European Patent 0410654, JP-A-3-288853, and JP-A-4-25845.

Preferred o-naphthoquinonediazide compounds for use in the positive working photosensitive compositions is an ester of 1,2-diazonaphthoquinonesulfonic acid with pyrogallol-acetone resin as described in JP-B-43-28403. Other preferred examples of orthoquinonediazide compounds include an ester of 1,2-diazonaphthoquinone-5-sulfonic acid with a phenol-formaldehyde resin as described in U.S. Pat. Nos. 8,046,120 and 3,188,210, and an ester of 1,8-diazonaphthoquinone-1-sulfonic acid with a phenol-formaldehyde resin as described in JP-A-2-96163, JP-A-2-96165, and JP-A-2-96761. Other known useful o-naphthoquinonediazide compounds described in many patents may be used. Examples of these useful o-naphthoquinonediazide compounds include those described in JP-A-47-5303, JP-A-48-35802, JP-A-48-63803, JP-A-48-96575, JP-A-49-38701, JP-A-48-13854, JP-B-37-18015, JP-B-41-11222, JP-B-45-9610, JP-B-49-17481, U.S. Pat. Nos. 2,797,213, 3,453,400, 3,544,323, 3,573,917, 3,674,495, and 3,785,825, British Patents 1,227,602, 1,251,345, 1,267,005, 1,329,888, and 1,330,932, and German Patent 854,890.

A particularly preferred o-naphthoquinonediazide compound for use in the present invention is one obtained by the reaction of a polyhydroxy compound having a molecular weight of not more than 1,000 with 1,2-diazonaphthoquinonesulfonic acid. Specific examples of such a compound include those described in JP-A-51-139402, JP-A-58-150948, JP-A-58-203434, JP-A-59-165053, JP-A-60-121445, JP-A-60-134235, JP-A-60-163043, JP-A-61-118744, JP-A-62-10645, JP-A-62-10646, JP-A-62-153950, JP-A-62-178562, JP-A-64-76047, U.S. Pat. Nos. 3,102,809, 3,126,281, 3,130,047, 3,148,983, 3,184,310, 3,188,210, and 4,639,406.

In the synthesis of these o-naphthoquinonediazide compounds, 1,2-diazonaphthoquinonesulfonic chloride is preferably reacted in an amount of from 0.2 to 1.2 equivalents, particularly from 0.3 to 1.2 equivalents of hydroxyl group in the polyhydroxyl compound. As 1,2-diazonaphthoquinonesulfonic chloride there may be used 1,2-diazonaphthoquinone-5-sulfonic chloride or 1,2-diazonaphthoquinone-4-sulfonic chloride.

The resulting o-naphthoquinonediazide compound is a mixture of those having different positions and the amounts of 1,2-diazonaphthoquinonesulfonic ester group introduced therein. The mixture preferably comprises a compound which hydroxyl groups are fully 1,2-diazonaphthoquinonesulfonically esterified, the proportion of the compound in the mixture being preferably not less than 5 mol %, more preferably from 20 to 99 mol %.

The content of such a positive-working photosensitive compound (including the foregoing combination) in the photosensitive composition is preferably from 10 to 50% by weight, more preferably from 15 to 40% by weight.

The photosensitive layer may be formed with the o-quinonediazide compound alone. However, the photosensitive layer preferably further comprises a resin soluble in an alkaline aqueous solution as a binder. As such a resin soluble in an alkaline aqueous solution there may be used a novolak resin. Examples of such a novolak resin include phenol-formaldehyde resin, o-cresol-formaldehyde resin, m-cresol-formaldehyde resin, p-cresol-formaldehyde resin, m/p-mixed cresol-formaldehyde resin, phenol/cresol (o-, m-, p-, m/p- and o/m-mixed) mixed formaldehyde resin.

Furthermore, phenol-modified xylene resins, polyhydroxystyrenes, polyhalogenated hydroxystyrenes, and acrylic resins containing a phenolic hydroxyl group as disclosed in JP-A-51-34711 may be used as the binder resin.

Other preferred examples of binder include copolymers generally having a molecular weight of from 10,000 to 200,000 comprising one or more of monomers selected from the following monomers (1) to (13) as constituent unit(s):

(1) Acrylamides, methacrylamides, ester acrylates, ester methacrylates and hydroxystyrenes each having an aromatic hydroxyl group, such as N-(4-hydroxyphenyl) acrylamide, N-(4-hydroxyphenyl)methacrylamide, o-hydroxystyrene, m-hydroxystyrene, p-hydroxystyrene, o-hydroxyphenyl acrylate, o-hydroxyphenyl methacrylate, m-hydroxyphenyl acrylate, m-hydroxyphenyl methacrylate, p-hydroxyphenyl acrylate and p-hydroxyphenyl methacrylate;

(2) Ester acrylates and ester methacrylates each having an aliphatic hydroxyl group, such as 2-hydroxyethyl acrylate and 2-hydroxyethyl methacrylate;

(3) Unsaturated carboxylic acids such as acrylic acid, methacrylic acid, maleic anhydride and metaconic acid;

(4) (Substituted) ester acrylates such as methyl acrylate, ethyl acrylate, propyl acrylate, butyl acrylate, amyl acrylate, hexyl acrylate, cyclohexyl acrylate, octyl acrylate, phenyl acrylate, benzyl acrylate, 2-chloroethyl acrylate, 4-hydroxybutyl acrylate, glycidyl acrylate and N-dimethylaminoethyl acrylate;

(5) (Substituted) ester methacrylates such as methyl methacrylate, ethyl methacrylate, propyl methacrylate, butyl methacrylate, amyl methacrylate, hexyl methacrylate, cyclohexyl methacrylate, octyl methacrylate, phenyl methacrylate, benzyl methacrylate, 2-chloroethyl methacrylate, 4-hydroxybutyl methacrylate, glycidyl methacrylate and N-dimethylaminoethyl methacrylate;

(6) Acrylamides or methacrylamides such as acrylamide, methacrylamide, N-methylol acrylamide, N-methylol methacrylamide, N-ethyl acrylamide, N-ethyl methacrylamide, N-hexyl acrylamide, N-hexyl methacrylamide, N-cyclohexyl acrylamide, N-cyclohexyl methacrylamide, N-hydroxyethyl acrylamide, N-hydroxyethyl acrylamide, N-phenyl acrylamide, N-phenyl methacrylamide, N-benzyl acrylamide, N-benzyl methacrylamide, N-nitrophenyl acrylamide, N-nitrophenyl methacrylamide, N-ethyl-N-phenyl acrylamide and N-ethyl-N-phenyl methacrylamide;

(7) Vinyl ethers such as ethyl vinyl ether, 2-chloroethyl vinyl ether, hydroxyethyl vinyl ether, propyl vinyl ether, butyl vinyl ether, octyl vinyl ether and phenyl vinyl ether;

(8) Vinylester such as vinyl acetate, vinyl chloroacetate, vinyl butyrate and vinyl benzoate;

(9) Styrenes such as styrene, methylstyrene and chloromethylstyrene;

(10) Vinylketones such as methyl vinyl ketone, ethyl vinyl ketone, propyl vinyl ketone and phenyl vinyl ketone;

(11) Olefins such as ethylene, propylene, isobutylene, butadiene and isoprene;

(12) N-vinylpyrrolidone, N-vinylcarbazole, 4-vinylpyridine, acrylonitrile, methacrylonitrile, etc.; and

(13) Acrylamides such as N-(o-aminosulfonylphenyl) acrylamide, N-(m-aminosulfonylphenyl) acrylamide, N-(p-aminosulfonyl phenyl)acrylamide, N-[1-(3-aminosulfonyl)naphthyl]acrylamide, N-(2-aminosulfonylethyl) acrylamide), methacrylamides such as N-(o-aminosulfonylphenyl) methacrylamide, N-(m-aminosulfonylphenyl)methacrylamide, N-(p-aminosulfonylphenyl) methacrylamide, N-[1-(3-aminosulfonyl)naphthyl] methacrylamide, N-(2-aminosulfonyl ethyl)methacrylamide), ester acrylates such as o-aminosulfonyl phenyl acrylate, m-aminosulfonylphenyl acrylate, p-aminosulfonylphenyl acrylate, 1-(3-aminosulfonylphenyl naphthyl)acrylate), and unsaturated sulfonamides of an ester methacrylate such as o-aminosulfonylphenyl methacrylate, m-aminosulfonylphenyl methacrylate, p-aminosulfonylphenyl methacrylate, 1-(3-aminosulfonylphenylnaphthyl)methacrylate)

Furthermore, monomers copolymerizable with the foregoing monomers may be copolymerized. The copolymer obtained by the copolymerization of the foregoing monomers may be modified by glycidyl acrylate, glycidyl methacrylate or the like. However, the copolymer is not limited to these compounds.

The foregoing copolymer preferably comprises an unsaturated carboxylic acid listed in the group (3). The preferred acid value of the copolymer is from 0 to 10 meq/g, preferably from 0.2 to 5.0 meq/g.

The preferred molecular weight of the foregoing copolymer is from 10,000 to 100,000.

Furthermore, one or more of a polyvinyl butyral resin, a polyurethane resin, a polyamide resin and an epoxy resin may be added to the copoymer.

The above described alkali-soluble high molecular weight compounds may be used alone or in combination of two or more thereof, in an amount of not more than 80% by weight based on the total weight of the photosensitive composition.

Furthermore, as described in U.S. Pat. No. 4,123,279, a condensate of phenol having a $C_{3-8}$ alkyl group as a substituent with formaldehyde, such as t-butylphenol-formaldehyde resin and octylphenol-formaldehyde resin, is preferably used in combination with the foregoing components to enhance the ink-receptivity of image.

One or more of cyclic acid anhydrides, phenols or organic acids are preferably added to the photosensitive composition of the present invention.

Examples of the cyclic acid anhydrides for use in the present invention include phthalic anhydride, tetrahydrophthalic anhydride, hexahydrophthalic anhydride, 3,6-endoxy-$\Delta^4$-tetrahydrophthalic anhydride, tetrachlorophthalic anhydride, maleic anhydride, chloromaleic anhydride, α-phenylmaleic anhydride, succinic anhydride, and pyromellitic anhydride.

Examples of the phenol for use in the present invention include bisphenol A, p-nitrophenol, p-ethoxyphenol, 2,4,4'-trihydroxybenzophenone, 2,3,4-trihydroxybenzophenone, 4-hydroxybenzophenone, 4,4',4"-trihydroxytriphenylmethane, and 4,4',3",4"-tetrahydroxy-3,5,3',5'-tetramethyltriphenyl methane.

Examples of the organic acid for use in the present invention include sulfonic acids, sulfinic acids, alkylsulfuric acids, phosphonic acids, ester phosphates and carboxylic acids. Specific examples of these organic acids include p-toluenesulfonic acid, dodecylbenzenesulfonic acid, p-toluenesulfinic acid, ethylsulfuric acid, phenylphosphonic acid, phenylphosphinic acid, phenyl phosphate, diphenyl phosphate, benzoic acid, isophthalic acid, adipic acid, p-toluic acid, 3,4-dimethoxybenzoic acid, phthalic acid, terephthalic acid, 1,4-cyclohexene-2,2-dicarboxylic acid, erucic acid, lauric acid, n-undecanoic acid and ascorbic acid.

The content of the foregoing cyclic acid anhydride, phenol and organic acid in the photosensitive composition is preferably from 0.05 to 15% by weight, more preferably from 0.1 to 5% by weight.

Furthermore, a nonionic surface active agent as described in JP-A-62-251740 and an amphoteric surface active agent as described in JP-A-4-13149 may be added to the photosensitive composition to enhance the processing stability against the development conditions (so-called development latitude).

Specific examples of the nonionic surface active agent include sorbitan tristearate, sorbitan monopalmitate, sorbitan trioleate, monoglyceride stearate, polyoxyethylene sorbitan monooleate and polyoxyethylene nonyl phenyl ether.

Specific examples of the amphoteric surface active agent include alkyldi(aminoethyl)glycine, alkylpolyaminoethyl glycine hydrochloride, 2-alkyl-N-carboxyethyl-N-hydroxyethyl imidazoliniumbetaine, N-tetradecyl-N,N-betaine (e.g., Amogen K, available from Daiichi Kogyo Co., Ltd.), and alkylimidazoline (e.g., Lebon 15 available from Sanyo Chemical Industries, Ltd.).

The content of the foregoing nonionic surface active agent and amphoteric surface active agent in the photosensitive composition is preferably from 0.05 to 15% by weight, more preferably from 0.1 to 5% by weight.

A printing-out agent for providing a visible image immediately after exposure or a dye or pigment as an image colorant may be added to the photosensitive composition.

Representative examples of the printing-out agent include a combination of a compound which releases an acid upon exposure (light-acid releasing agent) and an organic dye capable of forming a salt. Specific examples of such a combination include a combination of o-naphthoquinonediazide sulfonic acid halide and a salt-forming organic dye as described in JP-A-50-36209, and JP-A-53-8128, and a combination of a trihalomethyl compound and a salt-forming organic dye as described in JP-A-53-36223, JP-A-54-74728, JP-A-60-3626, JP-A-61-143748, JP-A-61-151644, and JP-A-63-58440. Examples of such a trihalomethyl compound include oxazole compounds and triazine compounds. Both of the compounds exhibit an excellent stability upon aging and hence provide a definite printed-out image.

As the image colorant there may be used dyes other than the foregoing basic organic dyes. Preferred examples of dyes including the basic organic dyes, include oil-soluble dyes and basic dyes. Specific examples of these dyes include oil yellow #101, oil yellow #103, oil pink #312, oil green BG, oil blue BOS, oil blue #603, oil black BY, oil black BS, oil black T-505 (available from Orient Chemical Industries, Ltd.), victoria pure blue, crystal violet (CI42555), methyl violet (CI42535), ethyl violet, rhodamine B (CI145170B), malachite green (CI42000) and methylene blue (CI52015). Furthermore, dyes described in JP-A-62-293247 are particularly preferred.

The photosensitive composition is applied to a support, i.e., the aluminum web in the form of solution in a solvent capable of dissolving the foregoing various components. As the solvent there may be used organic solvents as described in JP-A-62-251739, singly or in admixture of two or more thereof.

The photosensitive composition is dissolved and dispersed in a solid concentration of from 2 to 50% by weight, applied to the support, and then dried.

The amount of the photosensitive composition layer (photosensitive layer) to be applied to the support depends on the purpose but the coated amount after dried is preferably from 0.3 to 4.0 g/m$^2$. The less the coated amount of the photosensitive layer is, the less is the exposure amounts required to obtain an image, but the lower is the film strength. The more the coated amount of the photosensitive layer is, the more is the exposure amounts required to obtain an image, but the higher is the film strength. Therefore, when such a photosensitive composition is used to prepare a printing plate for example, a printing plate which can print a great number of sheets (large printing durability) can be obtained.

A surface active agent for enhancing the properties of the coated surface such as fluorine-containing surface active agents as described in JP-A-62-170950 may be added to the photosensitive composition. The amount of such a surface active agent to be added is preferably from 0.001 to 1.0% by weight, more preferably from 0.005 to 0.5% by weight based on the total weight of the photosensitive composition.

Examples of the photosensitive composition for use in negative working PS printing plates include a photosensitive layer containing a photosensitive diazo compound, a photopolymerizable photosensitive layer, a photo-crosslinkable photosensitive layer and the like. The present invention is described in detail below with reference to a photo-setting photosensitive copying material comprising a photosensitive diazo compound among these photosensitive compositions.

The photosensitive diazo compound is preferably a diazo resin obtained by the condensation of an aromatic diazonium salt with a reactive carbonyl-containing organic condensation agent, particularly an aldehyde such as formaldehyde and acetaldehyde or acetal, in an acidic medium. One of the most representative examples among these diazo resins is a condensate of p-diazodiphenylamine with formaldehyde. The process for the synthesis of these diazo resins is described in U.S. Pat. Nos. 2,678,498, 3,050,502, 3,311,605, and 3,277,074.

Examples of the preferred photosensitive diazo compound further include diazo compounds obtained by the copolycondensation of an aromatic diazonium salt with a substituted aromatic compound free of a diazonium group as described in JP-B-49-48001. Particularly preferred among these diazo compounds are diazo compounds obtained by the copolycondensation of an aromatic diazonium salt with an aromatic compound substituted by an alkali-soluble group such as a carboxyl group and a hydroxyl group.

Furthermore, photosensitive diazo compounds obtained by the copolycondensation of an aromatic diazonium salt with a reactive carbonyl compound having an alkali-soluble group as described in JP-A-4-18559, JP-A-4-190361, and JP-A-4-172353 are preferably used.

The diazo resin may comprises, as a counter anion of diazonium salt, an inorganic anion such as a mineral acid such as hydrochloric acid, hydrobromic acid, sulfuric acid and phosphoric acid or a complex salt thereof with zinc chloride. A diazo resin which is substantially insoluble in water but soluble in an organic solvent is particularly preferred. Such a preferred diazo resin is further described in JP-B-47-1167, and U.S. Pat. No. 3,300,309.

Furthermore, a diazo resin comprising, as a counter anion, a halogenated Lewis acid such as tetrafluoroboric acid and hexafluorophosphoric acid or perhalogenic acid such as perchloric acid and periodic acid as described in JP-A-54-98613 and JP-A-56-121031 is preferably used.

Furthermore, a diazo resin comprising, as a counter anion, sulfonic acid having a long-chain alkyl group as described in JP-A-58-209733, JP-A-62-175731 and JP-A-63-262643 is preferably used.

The photosensitive diazo compound is preferably contained in the photosensitive layer in an amount of from 5 to 50% by weight, preferably from 8 to 20% by weight.

An alkali-soluble or swelling lipophilic high molecular weight compound is preferably used, as a binder resin, together with the photosensitive diazo compound. Examples of such a lipophilic high molecular weight compound include copolymers generally having a molecular weight of 10,000 to 200,000 which comprises, as a constituent unit, the same monomer(s) selected from (1) to (13) as used in the positive-working photosensitive composition. Furthermore, high molecular weight compounds obtained by the copolymerization of the following monomers (14) and (15) as constituent units may be used.

(14) Unsaturated imide such as maleimide, N-acryloyl acrylamide, N-acetylacrylamide, N-propionylacrylamide, N-(p-chlorobenzoyl)acylamide, N-acetylacrylamide, N-acryloyl methacrylamide, N-acetylmethacrylamide, N-propionyl methacrylamide and N-(p-chlorobenzoyl) methacrylamide

(15) Unsaturated monomer having crosslinkable group in its side chain, such as N-[2-(acryloyloxy)-ethyl]-2,3-dimethylmaleimide, N-[6-(methacryloyloxy)-hexyl]-2,3-dimethylmaleimide and vinyl cinnamate Furthermore, a monomer copolymerizable with the foregoing monomers may be copolymerized. The copolymer obtained by the copolymerization of the foregoing monomers may be modified by glycidyl acrylate, glycidyl methacrylate or the like. However, the copolymer is not limited to these compounds.

The foregoing copolymer preferably comprises an unsaturated carboxylic acid listed in the group (3). The preferred acid value of the copolymer is from 0 to 10 meq/g, more preferably from 0.2 to 5.0 meq/g.

The preferred molecular weight of the foregoing copolymer is from 10,000 to 110,000.

Furthermore, a polyvinyl butyral resin, a polyurethane resin, a polyamide resin or an epoxy resin may be added to the copolymer as necessary. Moreover, a novolak resin, phenol-modified xylene resin, polyhydroxystyrene, polyhalogenated hydroxystyrene or phenolic hydroxyl-containing alkali-soluble resin as disclosed in JP-A-51-43711 may be added to the copolymer.

These alkali-soluble high molecular weight compounds may be used, singly or in combination of two or more thereof. The alkali-soluble high molecular weight compound is generally contained in the photosensitive composition in an amount of from 40 to 95% by weight based on the total solid content of the photosensitive composition.

To the photosensitive composition is generally added an agent for enhancing the ink-receptivity of image (e.g., a half ester of a styrene-maleic anhydride copolymer with an alcohol, a novolak resin, a 50% aliphatic ester of p-hydroxystyrene, as described in JP-A-55-527).

To the photosensitive composition is generally further added a plasticizer for rendering the coating layer flexible and for imparting abrasion resistance to the coating layer. Examples of the plasticizer include butyl phthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, acrylic acid oligomer, acrylic acid polymer, methacrylic acid oligomer and methacrylic acid polymer. Particularly preferred among these plasticizers is tricresyl phosphate.

Furthermore, phosphoric acid, phosphorous acid, citric acid, oxalic acid, dipicric acid, benzenesulfonic acid, naphthalenesulfonic acid, sulfosalicylic acid, 4-methoxy-2-hydroxybenzophenone-5-sulfonic acid or tartaric acid may be added to the photosensitive composition for enhancing the stability upon aging.

A printing-out agent for providing a visible image immediately after exposure or a dye or pigment as an image colorant may be added to the photosensitive composition.

As the above described dye, there may be preferably used one which reacts with a free radical or acid to change its tone. Examples of dyes which change its tone from some color to colorless or different colors include triphenylmethane, diphenylmethane, oxazine, xanthene, iminonaphthoquinone, azomethine and anthraquinone dyes such as victoria pure blue BOH (available from Hodogaya Chemical Co., Ltd.), oil yellow #101, oil yellow #103, oil pink #312, oil red, oil green BG, oil blue BOS, oil blue #603, oil black BY, oil black BS and oil blue T-505 (available from Orient Chemical Industries, Ltd.), patent pure blue (available from Sumitomo Mikuni Chemical Co., Ltd.), crystal violet (CI42555), methyl violet (CI42535), ethyl violet, rhodamine B (CI145170B), malachite green (CI42000), methylene blue (CI52015), brilliant blue, methyl green, erythrinin B, fuchsin basic, m-cresol purple, auramine, 4-p-diethylaminophenyliminaphthoquinone and cyano-p-diethylaminophenylacetanilide.

On the other hand, examples of dyes which change from colorless to some color include leuco dyes, and primary or secondary arylamine dyes such as triphenylamine, diphenylamine, o-chloroaniline, 1,2,3-triphenylguanidine, naphthylamine, diaminodiphenylmethane, p,p'-bis-dimethylaminodiphenylamine, 1,2-dianilinoethylene, p,p', p"-tris-dimethylaminotriphenylmethane, p,p'-bis-dimethylaminodiphenylmethylimine, p,p',p"-triamino-o-methyltriphenylmethane, p,p'-bis-dimethylaminodiphenyl-4-anilinonaphthylmethane and p,p',p"-triaminotriphenylmethane.

Preferred among these dyes are triphenylmethane and diphenylmethane dyes, particularly triphenylmethane dyes. In particular, victoria pure blue BOH is preferred.

The foregoing dye is generally contained in the photosensitive composition in an amount of about 0.5 to 10% by weight, more preferably about 15% by weight.

One or more of cyclic acid anhydrides, phenols, organic acids and higher alcohols may be added to the photosensitive composition to enhance its developability.

The photosensitive composition may be applied to a support, i.e., the aluminum web in the form of solution in a solvent capable of dissolving the foregoing various components therein. As such a solvent there may be used organic solvents as described in JP-A-62-2517391, singly or in admixture.

The photosensitive composition is dissolved and dispersed in a solid concentration of from 2 to 50% by weight, applied to the support, and then dried.

The amount of the photosensitive composition layer (photosensitive layer) to be applied to the support depends on the purpose but the coated amount after dried is preferably from 0.3 to 4.0 $g/m^2$. The less the coated amount of the photosensitive layer is, the less is the exposure amount required to obtain an image, but the lower is the film strength. The more the coated amount of the photosensitive layer is, the more is the exposure amount required to obtain an image, but the higher is the film strength. Therefore, when such a photosensitive composition is used to prepare a printing plate for example, a printing plate which can print a great number of sheets (large printing durability) can be obtained.

A surface active agent for enhancing the properties of the coated surface such as fluorinic surface active agent as described in JP-A-62-170950 may be added to the photosensitive composition.

In the preparation of the photosensitive lithographic printing plate, the application of the photosensitive layer for use in the present invention to the front surface of the support may be conducted either prior to or after the application of a backcoat layer to the back surface of the support. Alternatively, these layers may be applied simultaneously.

A coating layer made of an organic high molecular weight compound (hereinafter referred to as "backcoat layer") may be provided, if needed, on the back surface of the support of the photosensitive lithographic printing plate (PS plate) opposite the photosensitive layer to prevent scratching when a plural of plates are superimposed on each other.

As the main component of the backcoat layer there may be used at least one resin having a glass transition point of not lower than 20° C. selected from the group consisting of saturated copolymer polyester resins, phenoxy resins, polyvinylacetal resins and vinylidene chloride resins.

The saturated copolymer polyester resin is made of dicarboxylic acid unit and diol unit. Examples of the dicarboxylic acid unit of the polyester for use in the present invention include aromatic dicarboxylic acids such as phthalic acid, terephthalic acid, isophthalic acid, tetrabromophthalic acid and tetrachlorophthalic acid, and saturated aliphatic dicarboxylic acids such as adipic acid, azelaic acid, succinic acid, oxalic acid, suberic acid, sebacic acid, malonic acid and 1,4-cyclohexanedicarboxylic acid.

A dye or pigment for coloration, a silane coupling agent, diazo resin made of a diazonium salt, organic phosphonic acid, organic phosphoric acid or cationic polymer for enhancing the adhesion to the aluminum support, and a wax, higher aliphatic acid, higher aliphatic amide, silicone compound made of dimethylsiloxane, modified dimethylsiloxane or polyethylene powder commonly used as a lubricant, may be appropriately added to the backcoat layer.

The thickness of the backcoat layer is not specifically limited so far as the photosensitive layer can be hardly scratched even if not laminated with paper. It is preferably from 0.01 to 8 μm. If the thickness of the backcoat layer falls below 0.01 μm, the photosensitive layer cannot be prevented from being scratched when PS plates are handled in stack. On the other hand, if the thickness of the backcoat layer exceeds 8 μm, the backcoat layer swells with chemicals used around the printing plate during printing to show a change in its thickness resulting in the change of applied printing pressure that may deteriorate the printing properties.

The application of the backcoat layer to the back surface of the aluminum support can be accomplished by various methods. Examples of these methods include a method which comprises applying the backcoat layer to the aluminum support in the form of solution or emulsion dispersion in a proper solvent, and then drying, a method which comprises applying a film-formed backcoat layer to the aluminum support with an adhesive or under application of heating, and a method which comprises melt-extruding the backcoat layer to form a molten film which is then applied to the aluminum support. In order to secure the foregoing coated amount, the method which comprises applying the backcoat layer in the form of solution, and then drying is mostly preferred. As the solvent for use in this method there may be used organic solvents as described in JP-A-62-251739, singly or in admixture of two or more thereof.

Onto the photosensitive layer thus provided, a matting layer may be provided for reducing the time required to evacuate the air from the vacuum printing frame during contact exposure and for preventing print blur. Examples of a method for providing the matting layer include those described in JP-A-50-125805, JP-B-57-6582, and JP-B-61-28986, and a method which comprises heat-fusing a solid powder as described in JP-B-62-62337.

The average diameter of grains to be incorporated in the matting layer of the present invention is preferably not more than 100 μm. If the average grain diameter exceeds 100 μm, the area of the photosensitive layer contacting with the backcoat layer of another PS plate is increased when PS plates are stored in stack, to thereby reduce the slipperiness of the printing plate. As a results, the surface of both the photosensitive layer and backcoat layer tends to be scratched. The average height of the projected part of grains out of the matting layer is preferably not more than 10 $\mu$m, more preferably from 2 to 8 $\mu$m. When the average height exceeds this range, a fine wire can be hardly applied to the printing plate and the density of highlight dot is reduced, resulting in inadequate tone reproduction. On the contrary, if the average height falls below 2 $\mu$m, the adhesion in vacuo is insufficient, causing print blur. The coated amount of matting layer is preferably from 5 to 200 mg/m$^2$, more preferably from 20 to 150 mg/m$^2$. If the coated amount exceeds this range, the area contact of the photosensitive layer contacting with the backcoat layer of another PS plate is increased, to thereby cause scratching. On the contrary, if the coated amount of matting layer falls below this range, the adhesion in vacuum is insufficient.

PS plate thus obtained is exposed to active light rays from a carbon-arc lamp, mercury vapor lamp, metal halide lamp, xenon lamp, tungsten lamp or the like through a transparent original, and then developed.

As the developer and its replenisher for the PS plate of the present invention, there may be used a known alkaline aqueous solution. Examples of such a known alkaline aqueous solution include inorganic alkali agents such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogencarbonate, potassium hydrogencarbonate, ammonium hydrogencarbonate, sodium borate, potassium borate, ammonium borate, sodium hydroxide, ammonium hydroxide, potassium hydroxide and lithium hydroxide. Furthermore, organic alkali agents such as monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine and pyridine may be used.

These alkali agents may be used singly or in combination.

Particularly preferred as developer for positive-working PS plate among these alkali agents are aqueous solutions of silicate such as sodium silicate and potassium silicate. This is because that the developability can be controlled by the ratio of silicon oxide $SiO_2$ as a component of silicate to oxide of alkaline metal $M_2O$ (generally represented by $Si/M_2O$ molar ratio) and their concentration. For example, an aqueous solution of sodium silicate having an $SiO_2/Na_2O$ molar ratio of from 1.0 to 1.5 (i.e., $[SiO_2]/[Na_2O]$=1.0 to 1.5) and an $SiO_2$ content of from 1 to 4% by weight as described in JP-A-54-62004, or an aqueous solution of silicate of alkaline metal having an $SiO_2/M$ molar ratio of from 0.5 to 0.75 (i.e., $[SiO_2]/[M_2O]$=1.0 to 1.5) and an $SiO_2$ concentration of from 1 to 4% by weight and a potassium content of at least 20% based on the gram atom of all the alkaline metals present therein may be preferably used.

Furthermore, it has been known that when an automatic developing machine is used to develop PS plate, an aqueous solution (replenisher) having a higher alkalinity than the developer may be added to the developer to process a large amount of PS plates without replacing the developer in the tank over a prolonged period of time. This replenishment system is preferably used also in the present invention. For example, a process may be used which comprises the use of as a developer an aqueous solution of sodium silicate having an $SiO_2/Na_2O$ ratio of from 1.0 to 1.5 (i.e., $[SiO_2]/[Na_2O]$ =1.0 to 1.5) and an $SiO_2$ content of from 1 to 4% by weight, continuously or intermittently replenished by an aqueous solution of sodium silicate (replenisher) having an $SiO_2/Na_2O$ ratio of from 0.5 to 1.5 (i.e., $[SiO_2]/[Na_2O]$=0.5 to 1.5) depending on the processed amount of the positive-working photosensitive lithographic printing plate, as disclosed in JP-A-54-62004. Furthermore, a process may be used which comprises the use of a silicate of alkaline metal having $[SiO_2]/[M]$ ratio of from 0.5 to 0.75 (i.e., $[SiO_2]/[M_2]$=1.0) and an $SiO_2$ concentration of from 1 to 4% by weight as a developer and a silicate of alkaline metal having $[SiO_2]/[M]$ ratio of from 0.25 to 0.75 (i.e., $[SiO_2]/[M_2O]$=0.5 to 1.5) as a replenisher, both of which having a potassium content of at least 20% based on the gram atom of all alkaline metals present therein.

If as such a replenisher there is used a silicate of alkaline metal, its $[SiO_2]/[M_2O]$ molar ratio can be reduced to provide a higher activity that reduces the replenishment rate, thereby advantageously reducing the running cost and amount of waste liquid. However, it has been known that the activation of the replenisher is accompanied by the dissolution of the aluminum support for PS plate, thereby producing insoluble matters in the developer. In such a high activity system, the developer preferably comprises an aqueous solution of a silicate of alkaline metal having an $SiO_2/M$ molar ratio of from 0.7 to 1.5 and an $SiO_2$ concentration of from 1.0 to 4.0% by weight and the replenisher preferably comprises an aqueous solution of a silicate of alkaline metal having an $SiO_2/M_2O$ molar ratio of from 0.3 to 1.0 and an $SiO_2$ concentration of from 0.5 to 4.0% by weight.

To the developer and replenisher for use in the development of positive-working and negative-working PS plates, various surface active agents or organic solvents may be added, as necessary, for accelerating or inhibiting the developability thereof or enhancing the dispersion of development tails and the ink-receptivity of the image area on the printing plate. Preferred examples of surface active agents include anionic, cationic, nonionic and amphoteric surface active agents.

Specific examples of these surface active agents include nonionic surface active agents such as polyoxyethylene alkyl ethers, polyoxyethylene alkyl phenyl ethers, polyoxyethylene polystyryl phenyl ethers, polyoxyethylene polyoxypropylene alkyl ethers, partial esters of glycerin aliphatic acid, partial esters of sorbitan aliphatic acid, partial esters of pentaerythritol aliphatic acid, propylene glycol monoaliphatic esters, partial esters of sucrose aliphatic acid, partial esters of polyoxyethylene sorbitan aliphatic acid, partial esters of polyoxyethylene sorbitol aliphatic acid, polyethylene glycol aliphatic esters, partial esters of polyglycerin aliphatic acid, polyoxyethylenated castor oils, partial esters of polyoxyethylene glycerin aliphatic acid, aliphatic diethanolamides, N,N-bis-2-hydroxyalkylamine and derivatives thereof, polyoxyethylene alkylamine, triethanolamine aliphatic esters and trialkylamine oxide; anionic surface active agents such as aliphatic salts, abietates, hydroxyalkanesulfonates, alkanesulfonates, dialkylsulfosuccinic esters, straight-chain alkylbenzenesulfonates, branched alkylbenzenesulfonates, alkylnaphthalenesulfonates, alkylphenoxypolyoxyethylene propylsulfonates, polyoxyethylenealkylsulfophenylethers, N-methyl-N-oleyltaurine sodium salt, disodium N-alkylsulfosuccinic monoamide, petroleum sulfonates, sulfated beef tallows, sulfuric esters of aliphatic alkylester, alkylsulfuric esters, sulfuric esters of polyoxyethylene alkyl ether, sulfuric esters of aliphatic monoglyceride, sulfuric esters of polyoxyethylene alkyl phenyl ether, sulfuric ethylene of polyoxyethylene styryl phenyl ethers, alkylphosphoric esters, phosphoric esters of polyoxyethylene alkyl ether, phosphoric esters of polyoxyethylene alkyl phenyl ether, partial saponification products of a styrene/maleic anhydride copolymer, partial saponification products of an olefin/maleic anhydride copolymer and naphthalenestyrenate-formalin condensates; cationic surface active agents such as alkylamine salts, quaternary ammonium salts, polyoxyethylene alkylamine salts and polyethylenepolyamine derivatives; and amphoteric surface active agents such as carboxybetaines, aminocarboxylates, sulfobetaines, aminosulfuric ethers and imidazolines. The polyoxyethylene in the above listed surface active agents can be replaced by a polyoxyalkylene such as polyoxymethylene, polyoxypropylene and polyoxybutylene. These surface active agents are also included.

Further preferred surface active agents are fluorine-containing surface active agents containing a perfluoroalkyl group in its molecule. Examples of such a fluorinic surface active agent include anionic fluorinic surface active agents such as perfluoroalkylcarboxylates, perfluoroalkylsulfonates and perfluoroalkylphosphoric esters, amphoteric fluorinic surface active agents such as perfluoroalkylbetaine, cationic fluorinic surface active agents such as perfluoroalkyltrimethyl ammonium salt, and nonionic fluorinic surface active agents such as perfluoroalkylamine oxide, perfluoroalkylethylene oxide adduct, oligomer containing a perfluoroalkyl group and a hydrophilic group, oligomer containing a perfluoroalkyl group and a lipophilic group, oligomer containing a perfluoroalkyl group, a hydrophilic group and a lipophilic group and urethane containing a perfluoroalkyl group and a lipophilic group.

The above described surface active agents may be used, singly or in combination of two or more thereof. The surface active agent is preferably added to the developer in an amount of from 0.001 to 10% by weight, more preferably from 0.01 to 5% by weight based on the total weight of the developer.

As the foregoing organic solvent there may be preferably used one having a water solubility of not more than about 10% by weight, more preferably not more than 5% by weight. Examples of such an organic solvent include 1-phenyl ethanol, 2-phenylethanol, 3-phenyl-1-propanol, 4-phenyl-1-butanol, 4-phenyl-2-butanol, 8-phenyl-1-butanol, 2-phenoxy ethanol, 2-benzyloxyethanol, o-methoxybenzylalcohol, m-methoxybenzylalcohol, p-methoxybenzylalcohol, benzylalcohol, cyclohexanol, 2-methylcyclohexanol, 3-methylcyclohexanol, 4-methylcyclohexanol, N-phenylethanolamine and N-phenyldiethanolamine. The content of such an organic solvent is from 0.1 to 5% by weight based on the total weight of the solution used. The amount of the organic solvent to be used is closely related to the amount of the surface active agent to be used. Thus, it is preferred that the amount of the surface active agent to be used is preferably increased with the rise in the amount of the organic solvent to be used. This is because that when the amount of the surface active agent to be used is reduced while increasing the content of the organic solvent, the organic solvent cannot be thoroughly dissolved, making it impossible to expect a good developability.

To the developer and replenisher for use in the development of the PS plate, a reducing agent may be added. This is to inhibit stain on the printing plate. This is useful particularly in the development of a negative-working PS plate comprising a photosensitive diazonium salt. Preferred examples of such an organic reducing agent include phenol compounds such as thiosalicylic acid, hydroquinone, metol, methoxyquinone, resorcin and 2-methylresorcin, and amine compounds such as phenylenediamine and phenylhydrazine. Preferred examples of inorganic reducing agents include sodium, potassium and ammonium salts of inorganic acids such as sulfurous acid, hydrogensulfurous acid, phosphorous acid, hydrogenphosphorous acid, bihydrogenphosphorous acid, thiosulfuric acid and dithionic acid. Among these reducing agents, sulfites are most excellent in stainproofing effect. Such a reducing agent is preferably used in an amount of from 0.05 to 5% by weight based on the weight of the developer to be used.

To the developer and its replenisher, an organic carboxylic acid may be added. A preferred organic carboxylic acid is a $C_{6-80}$ aliphatic or aromatic carboxylic acid. Specific examples of such an aliphatic carboxylic acid include caproic acid, enanthylic acid, caprylic acid, lauric acid myristic acid, palmitic acid, and stearic acid. Particularly preferred among these organic carboxylic acids is a $C_{8-12}$ alkanic acid. Unsaturated aliphatic acids having a double bond in its carbon chain or having branched carbon chains may be used.

As the aromatic carboxylic acid there may be used an aromatic carboxylic acid having a carboxyl group substituted on its benzene ring, naphthalene ring, anthracene ring or the like. Specific examples of such a substituted aromatic carboxylic acid include o-chlorobenzoic acid, p-chlorobenzoic acid, o-hydroxybenzoic acid, p-hydroxybenzoic acid, o-aminobenzoic acid, p-aminobenzoic acid, 2,4-dihydroxybenzoic acid, 2,5-dihydroxybenzoic acid, 2,6-dihydroxybenzoic acid, 2,3-dihydroxybenzoic acid, 3,5-dihydroxybenzoic acid, gallic acid, 1-hydroxy-2-naphthoic acid, 3-hydroxy-2-naphthoic acid, 2-hydroxy-1-naphthoic acid, 1-naphthoic acid and 2-naphthoic acid. Particularly useful among these substituted aromatic carboxylic acids is hydroxynaphthoic acid.

The foregoing aliphatic or aromatic carboxylic acid are preferably used in the form of sodium, potassium or ammonium salt to enhance its water solubility. The content of the organic carboxylic acid in the developer for use in the present invention is not specifically limited. If the content of the organic carboxylic acid falls below 0.1% by weight, the resulting effect is not sufficient. On the contrary, even if the content of the organic carboxylic acid exceeds 10% by weight, the resulting effect does not go beyond the expected effect. Furthermore, it may prevent other additives, if any, from being dissolved. Therefore, the optimum content of the organic carboxylic acid is from 0.1 to 10% by weight, preferably from 0.5 to 4% by weight based on the weight of the developer to be used.

To the developer and its replenisher, known compounds such as an anti-foaming agent, a water softener and an organic boron compound as described in JP-B-1-57895 may be added.

Examples of the foregoing water softener include polyphosphoric acid and sodium, potassium and ammonium salts thereof, aminopolycarboxylic acid such as ethylenediamine tetraacetic acid, diethylenetriaminepentaacetic acid, triethylenetetraminehexaacetic acid, hydroxyethylethylene diaminetriacetic acid, nitrilotriacetic acid, 1,2-diamino cyclohexanetetraacetic acid and 1,3-diamino-2-propanoltetraacetic acid, sodium, potassium and ammonium salts of the aminopolycarboxylic acids, aminotri (methylenephosphonic acid), ethylenediaminetetra (methylenephosphonic acid), diethylene triaminepenta (methylenephosphonic acid), triethylene tetraminehexa (methylenephosphonic acid), hydroxyethylethylene diaminetri(methylenephosphonic acid), 1-hydroxyethane-1, 1-diphosphonic acid and sodium, potassium and ammonium salts thereof.

The optimum amount of the water softener to be added varies depending on its chelating power and the hardness and amount of the hard water to be processed. In general, it is preferably from 0.01 to 5% by weight, more preferably from 0.01 to 0.5% by weight based on the weight of the developer to be used. If it falls below this range, the desired object cannot be thoroughly achieved. On the contrary, if it exceeds this range, it gives adverse effects on the image area such as clearing.

The remainder of the components of the developer and its replenisher is water. However, the developer and its replenisher may further comprise various additives known in the art incorporated therein, as necessary.

From the standpoint of transportability, the developer and its replenisher can be advantageously stored in the form of a concentrated solution having a less water content than those to be used so that the concentrated solution is diluted with water when used. In this case, the concentration of the developer is preferably such that the various constituents do not undergo separation or precipitation.

The PS plate which has been thus developed is then subjected to a post-treatment with a rinsing water, a rinsing solution containing a surface active agent or the like, or a desensitizing solution containing gum arabic, a starch derivative or the like. The post-treatment of the PS plate of the present invention can be effected by these processing in combination.

The electrolytic cell for use in the present invention is preferably a radial cell. In a vertical or flat type electrolytic cell, the clearance between the aluminum web and the electrode can hardly be kept constant, causing the printing properties to vary widely in the width direction of the aluminum web. In the radial cell system, one or more power supplies for electrolysis can be connected to each electrolytic cell.

The ratio of anodic current to cathodic current in the alternating current applied to the aluminum web opposed to the main electrodes is preferably controlled to effect uniform graining. Furthermore, the auxiliary anode provided for inhibiting the dissolution of carbon from the main electrodes is preferably provided in a cell other than the radial cell in which the carbon electrodes as main electrodes are provided. The auxiliary anode comprises platinum, ferrite or the like. If the auxiliary anode is provided in the electrolytic cell through which the alternating current flows, the alternating current is partly conducts through the auxiliary anode, remarkably reducing the dissolution rate of the auxiliary anode as compared with the passage of pulse current.

Thus, current is partly shunted as direct current through a rectifying element or switching element to the auxiliary anode provided in a cell other than the cell having the two main electrodes provided therein to control the ratio of the current value contributing to the anode current acting on the surface of the aluminum web opposed to the main electrodes to the current value contributing to the cathode reaction. As a result, the power transformer is less subjected to uneven magnetization. Thus, no control is needed to eliminate uneven magnetization, giving an advantage that the power supply cost can be reduced.

Figure 3:
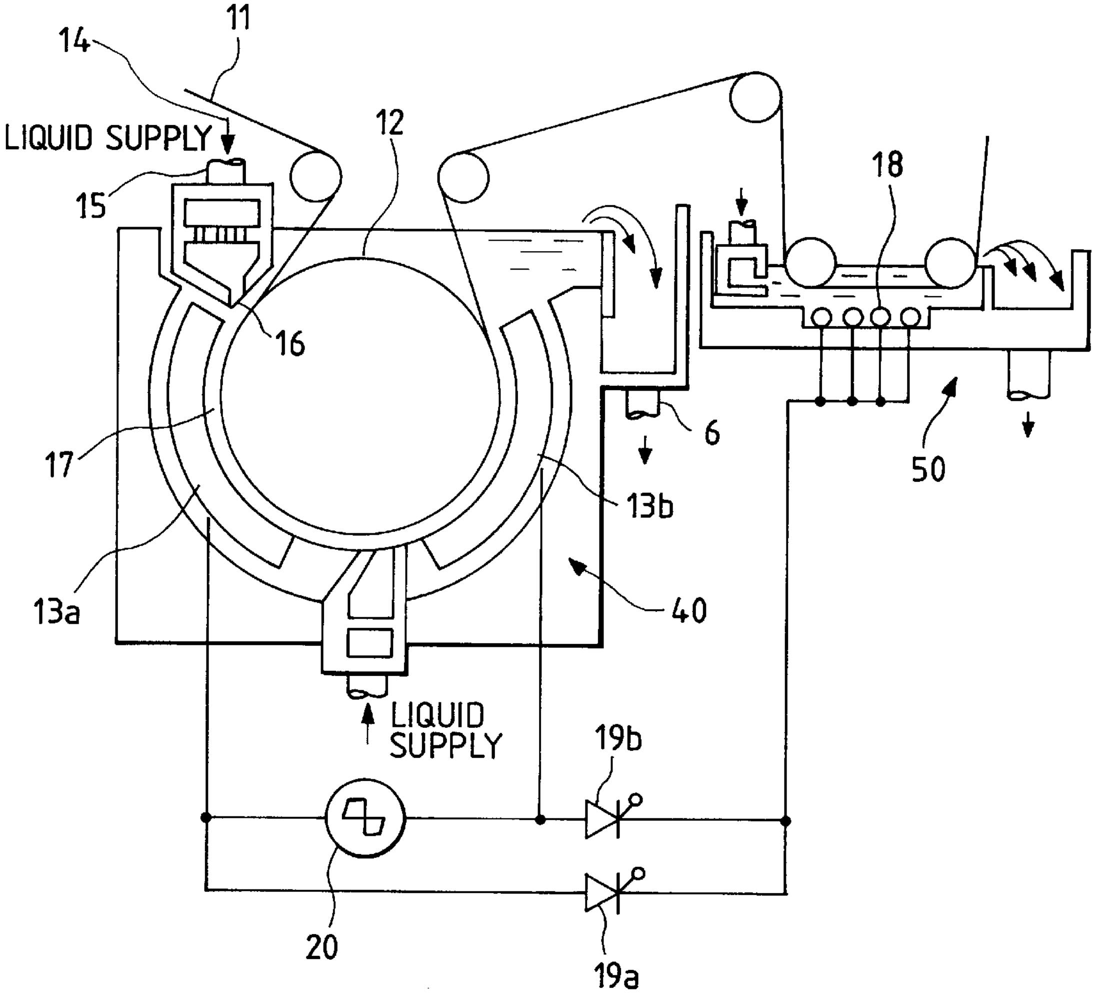
FIG. 3 is a side view of an embodiment of the apparatus having a radial drum roller for use in the electrochemical roughening process according to the present invention.

An apparatus for the electrochemical roughening in the present invention is shown in FIG. 3.

Figure 4:
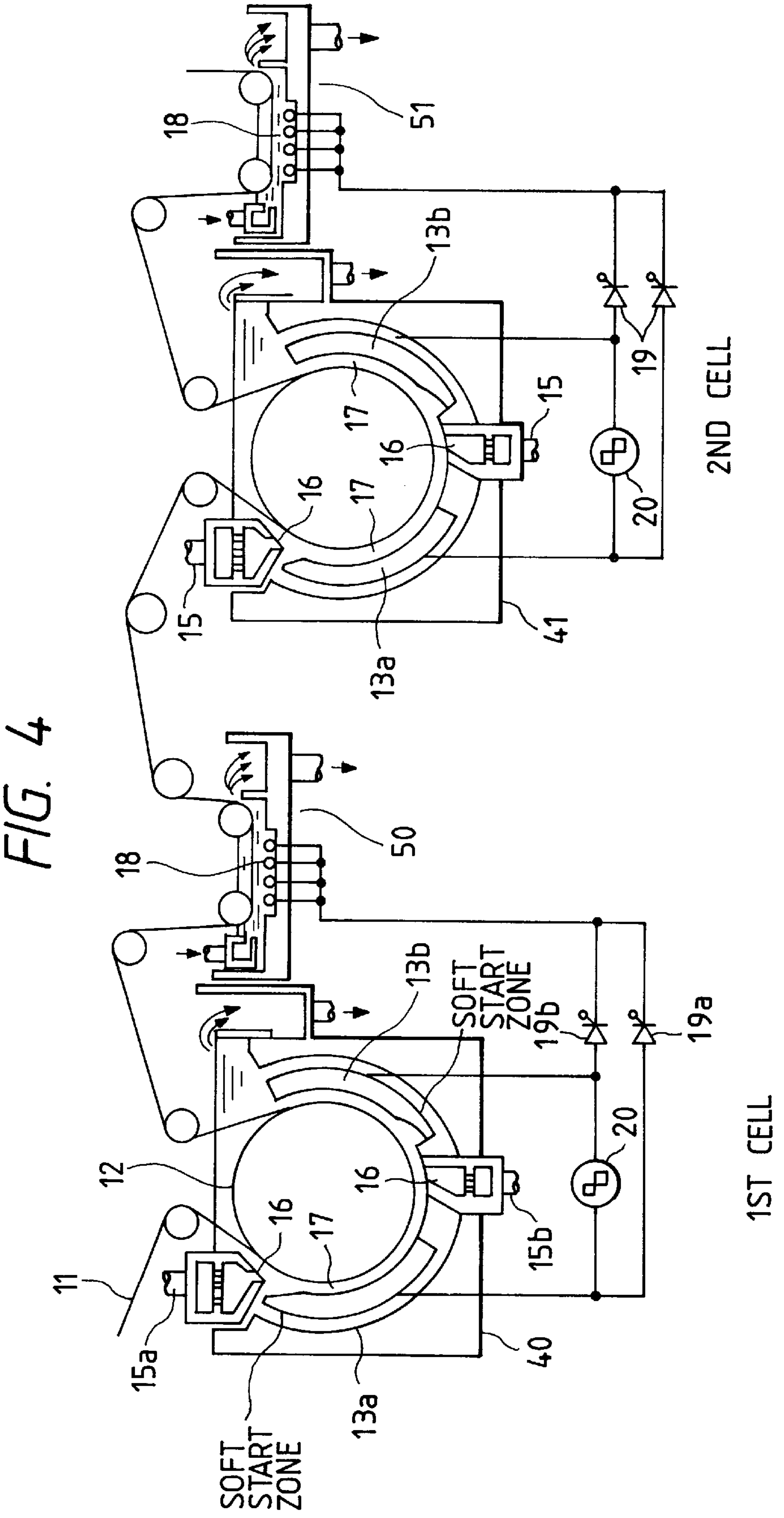
FIG. 4 is a side view of an embodiment of the apparatus for use in the electrochemical roughening process according to the present invention in which two apparatus having a radial drum roller are connected.
Figure 5:
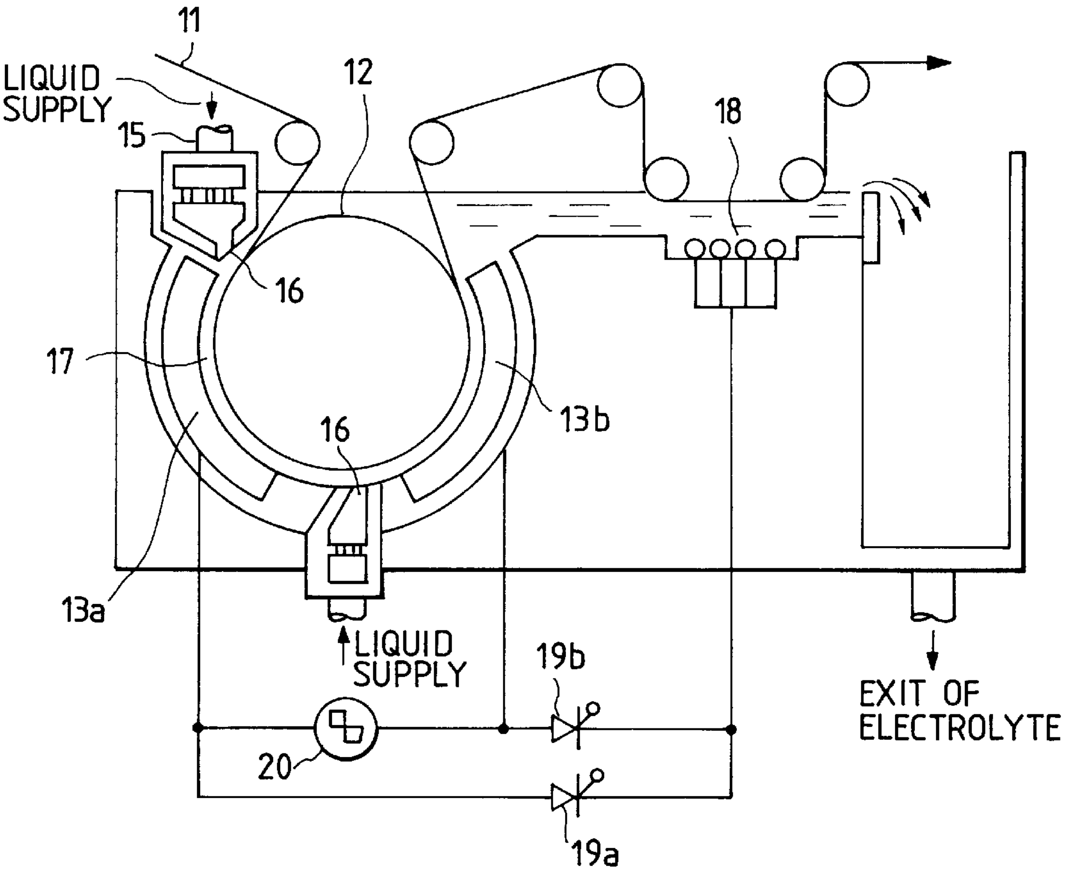
FIG. 5 is a side view of the apparatus comprising an auxiliary anode cell connected to a main electrode cell.

Reference numeral 11 represents an aluminum web. Reference numeral 12 represents a radial drum roller for supporting the aluminum web. The aluminum web moves in such a manner that it keeps a predetermined clearance to main electrodes 13*a* and 13*b* made of carbon and to an auxiliary anode 18 made of ferrite or platinum. The optimum clearance is generally from 3 to 50 mm. The ratio of the treatment length of the main electrodes to that of the auxiliary anode and the ratio of the length of the main electrode 13*a* to that of the main electrode 13*b* vary depending on electrolytic conditions. The ratio of the treatment length of the main electrode 13*a* to that of the main electrode 13*b* may be from 1:2 to 2:1 but is preferably adjusted to 1:1 if possible. The ratio of the treatment length of the main electrode 13*a* or 13*b* to that of the auxiliary anode 18 is preferably from 1:1 to 1:0.1. In order to inhibit the generation of socalled chatter mark, i.e., lateral uneven treatment which occurs perpendicular to the running direction of the aluminum web, a soft start zone as shown in FIG. 4 for low current density treatment is preferably provided at the leading end of the main electrodes 13*a* and 13*b* as described in JP-B-63-16000. The main electrodes 13 can be hardly rounded accurately along the periphery of the radial drum roller 12. Thus, an insulator having a thickness of from 1 mm to 5 mm is usually disposed interposed between the radial drum roller and the main electrodes as described in JP-A-5-195300.

The current to be passed to the auxiliary anode is obtained by shunting the alternating current from the power supply as a current of arbitrary value controlled through a rectifying element or switching element. The rectifying element is preferably a thyristor (19*a*, 19*b*). It can control the current to be passed to the auxiliary anode 18 by firing angle. By shunting the current to the auxiliary anode, the dissolution of the carbon electrode as a main electrode can be inhibited, to thereby control the roughened shape obtained in the electrochemical roughening process. The ratio of the current conducting through the carbon electrode to the current conducting through the auxiliary anode is preferably from 0.95:0.05 to 0.7:0.3.

The flow direction of the electrolyte may be forward or counter to the moving direction of the aluminum web. It is preferably counter to the moving direction of the aluminum web to minimize the generation of uneven treatment.

The electrolyte 14 enters through an electrolyte intake port 15. The electrolyte 14 then flows through a distributor into a cavity in such a manner that it is uniformly distributed all over the width of the radial drum roller 12. The electrolyte 14 is then jetted through a slit 16 into the electrolyte passage 17.

Two or more of the electrolytic apparatus of FIG. 3 may be juxtaposed with each other as shown in FIG. 4.

Figure 6:
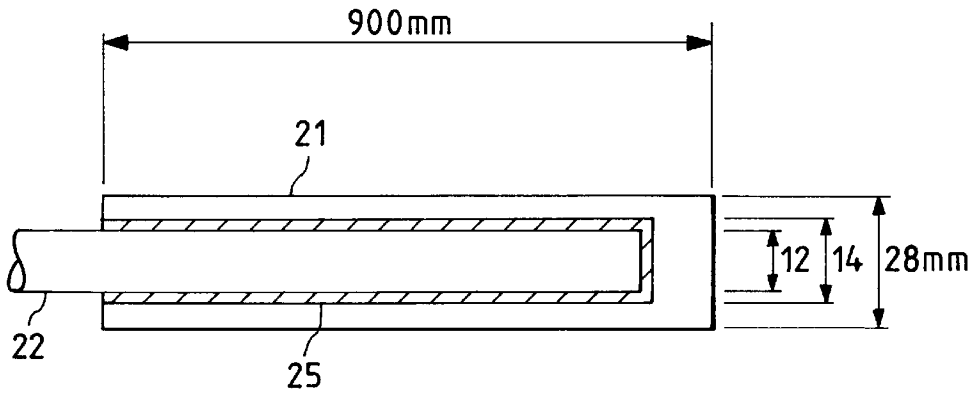
FIG. 6 is a sectional front view of a ferrite electrode for use as the auxiliary anode according to the present invention.
Figure 7:
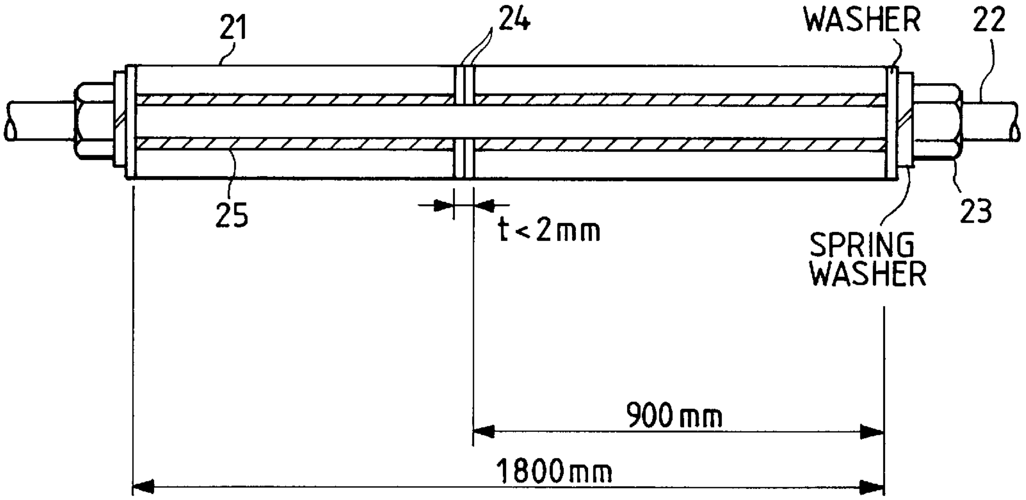
FIG. 7 is a sectional front view of an embodiment of a ferrite electrode having a ferrites-butted structure for use as the auxiliary anode according to the present invention.
Figure 8:
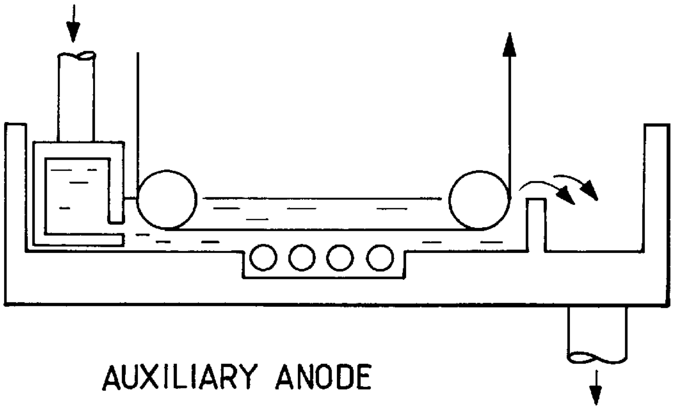
FIG. 8 is a sectional side elevation of an auxiliary anode cell according to the present invention.
Figure 9A:
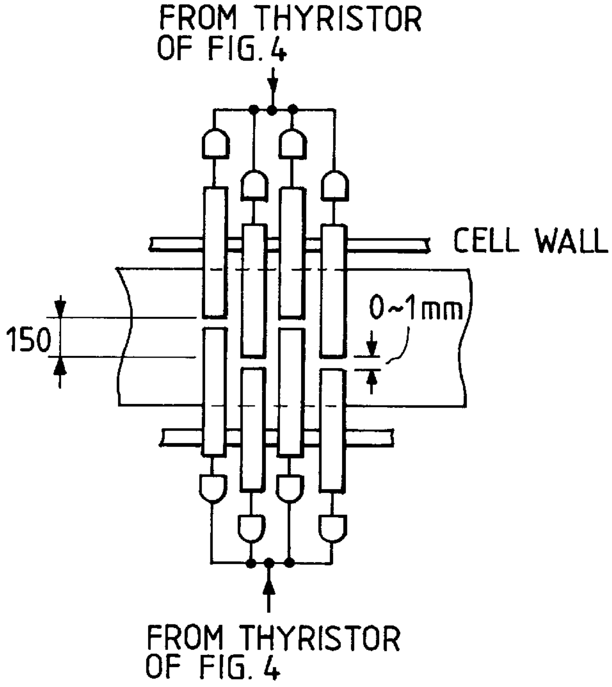
FIG. 9(*a*) is a top view of an embodiment of the auxiliary anode cell according to the present invention.
Figure 9B:
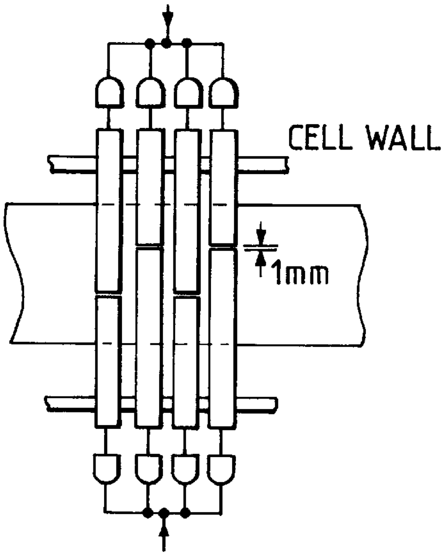
Figure 9C:
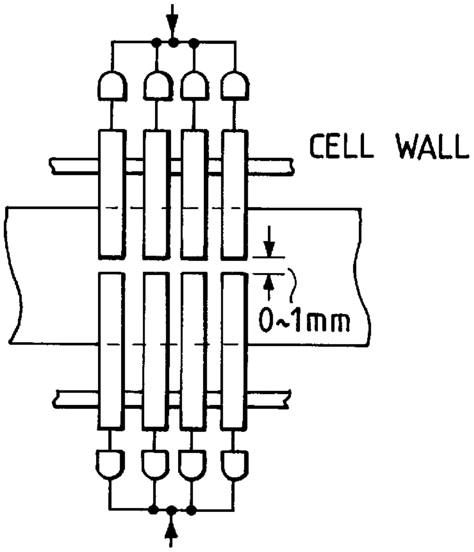

As shown in FIG. 6, the auxiliary anode cannot be prepared in a large size. Thus, a plurality of cylindrical ferrite electrodes having an outer diameter of from 20 mm to 30 mm may be juxtaposed with an insulator provided interposed therebetween. The ferrite electrode 21 can be provided only in a length of about 900 mm at maximum. Thus, as shown in FIG. 7, and FIG. 9 (*a*) to 9(*c*), two or more different ferrite electrodes may be butted to each other. Furthermore, the plurality of the ferrite electrodes are preferably arranged such that the butted positions are positioned zigzag longitudinally, minimizing the adverse effects due to the butted positions.

Furthermore, as shown in FIG. 7, the ferrite electrode 21 may be prepared by inserting a both end-threaded electrically-conductive metal rod 22 into two or more hollow cylindrical ferrites 20 having a length of from 100 mm to 900 mm, and by screwing with nuts 23 at both ends of the ferrites so that the ferrites are clamped. Thus, a ferrite electrode 21 having a length of not less than 1,000 mm can be prepared. The electrically-conductive metal rod 22 may be made of SUS, titanium, copper or the like. A known liquid sealing material 24 may be provided interposed between the electrodes to inhibit the penetration of the electrolyte through the joint into the cylinder. If an aqueous solution of nitric acid is used as an electrolyte, a fluororubber sealing material is particularly preferred. The length of the joint is preferably not more than 2 mm. If the length of the joint exceeds 2 mm, the electrolytic treatment is liable to the effect of the joint, causing uneven treatment. As the sealing material 24 there may be used a doughnut-shaped sealing material having the same section as that of the electrode. If only one sheet of seal packing is used, it is easily twisted when the combination is clamped from the both ends of the ferrites by screwing with a nut. Thus, two or more sheets of seal packing are preferably provided to absorb the twisting. The gap between the electrically-conductive metal rod 22 and the ferrite electrode 21 is preferably filled densely with an electrically-conductive adhesive 25 (Dotite D-753, available from Fujikura Ltd.). In the absence of the electrically-conductive adhesive 25, the concentration of electric current can easily take place inside the electrode, causing the cracking of the ferrite electrode 21.

The ferrite electrode having a length of not less than 1,000 mm obtained by i nserting a both end-threaded electrically-conductive metal rod 22 into a combination of two or more cylindrical ferrites 20 having a length of from 100 mm to 900 mm, and then clamping the assembly by a nut 23 or the like gives very little effect of the joint on the material to be treated. It can be used not only as an anode in the apparatus for the preparation of support for lithographic printing plate but also as anode in plating or electrolytic cleaning process. In the apparatus for roughening an aluminum support for lithographic printing plate, it can be used not only as an auxiliary anode but also as an anode in an apparatus for electrochemical roughening of an aluminum web in an acidic aqueous solution with an direct current applied across an odes and cathodes which are alternately arranged as described in JP-A-1-141094.

The present invention will be described in more detail with reference to the following Examples, but the invention should not be construed as being limited thereto.

EXAMPLE 1

0.24-mm thick aluminum web having JIS A1050 alloy composition which had been prepared by continuous cast-rolling according to a double roller casting method were subjected to two kinds of surface treatments A and B providing different surface grain shapes, respectively. Subsequently, these aluminum web thus treated were each dipped in a 1% aqueous solution of sodium hydroxide at a temperature of 40° C. for 30 seconds so that it was etched, dipped in a 30% aqueous solution of sulfuric acid at a temperature of 60° C. for 40 seconds so that it was desmutted, and then anodized in a 20% aqueous solution of sulfuric acid with direct current at a current density of 5 A/dm$^2$ so that an anodized film was produced at an oxide film coverage of 1.6 g/m$^2$ to prepare a substrate.

(Surface treatment A)

The aluminum web was brush-grained by a nylon brush having a bristle diameter of from 0.57 to 0.72 mm with supplying a suspension of pumice stone in water onto the surface thereof while adjusting the pressure of the nylon brush against the aluminum web to a predetermined pressure.

Subsequently, the aluminum web was thoroughly washed with water. The aluminum web was etched in a 10% solution of aluminum hydroxide at a temperature of 60° C. in such a manner that the dissolution of aluminum was from 4 to 12 g/m$^2$, washed with flowing water, neutralized and washed with a 20% nitric acid, and then washed with water. The aluminum web was then electrolytically roughened in a 1% nitric acid electrolyte with a trapezoidal alternating current having a zero-to-peak time (time required for current to reach from zero to peak) of from 1 to 3 msec and a frequency of from 50 Hz to 70 Hz at an anodizing electrical quantity of from 110 to 230 C/dm$^2$.

(Surface treatment B)

The aluminum web was etched in a 10% solution of aluminum hydroxide at a temperature of 60° C. in such a manner that the dissolution of aluminum was from 4 to 12 g/m$^2$, neutralized and washed with a 20% nitric acid, washed with water, and then electrolytically roughened in a 1% nitric acid electrolyte with a trapezoidal alternating current having a zero-to-peak time (time required for current to reach from zero to peak) of from 1 to 3 msec and a frequency of from 50 Hz to 70 Hz at an anodizing electrical quantity of from 110 to 230 C/dm$^2$.

The support which has been thus prepared according to the preparation process of the present invention was then provided with the following photosensitive layer to form a lithographic printing plate.

(Photosensitive solution)

| | |
|---|---|
| Esterification product of 1,2-diazonaphthoquinone-5-sulfonyl chloride with pyrogallol-acetone resin (as described in Example 1 of U.S. Patent 3,635,709) | 0.45 g |
| Cresol-formaldehyde novolak resin (meta-para ratio: 6:4; weight-average molecular weight: 3,000; number-average molecular weight: 1,100; unreacted cresol content: 0.7%) | 1.1 g |
| m-Cresol-formaldehyde novolak resin (weight-average molecular weight: 1,700; number-average molecular weight: 600; unreacted cresol content: 1%) | 0.3 g |
| Poly(N-(P-aminosulfonylphenyl)acrylamide-co-normalbutyl-acrylate-co-diethyleneglycol monomethyl ether methacrylate) (as described in Japanese Patent application No. 3-311241; molar ratio of various monomers: 40:40:20; weight-average molecular weight: 40,000; number-average molecular weight: 20,000) | 0.2 g |
| P-normaloctylphenol-formaldehyde resin (as described in U.S. Patent 4,123,279) | 0.02 g |
| Naphthoquinone-1,2-diazide-4-sulfonic chloride | 0.01 g |
| Tetrahydrophthalic anhydride | 0.1 g |
| Benzoic acid | 0.02 g |
| 4-[p-N,N-bis(ethoxycarbonylmethyl)aminophenyl]-2,6-bis(trichloromethyl)-S-triazine | 0.01 g |
| 4-[P-N-(P-hydroxybenzoyl)aminophenyl]-2,6-bis(trichloro-methyl)-S-triazine | 0.02 g |
| 1,3,4-Oxadiazole | 0.01 g |
| Dye obtained by replacing a counter anion in Victorian Pure Blue BOH by 1-naphthalenesulfonic acid | 0.02 g |
| Modiper-F-200 (fluorinic surface active agent, available from Nippon Oil & Fats Co., Ltd.; a solution in 30 wt % mixture of methyl ethyl ketone and methyl isobutyl ketone) | 0.06 g |
| Megafac F177 (fluorinic surface active agent, available from Dainippon Ink & Chemicals, Inc.; solution in 20 wt. % methyl isobutyl ketone) | 0.02 g |
| Methyl ethyl ketone | 15 g |
| 1-Methoxy-2-propanol | 10 g |

Onto the photosensitive layer thus applied was then electrostatically sprayed an aqueous solution of a 68/20/12 copolymer of methyl methacrylate, ethyl acrylate and sodium acrylate in accordance with the method described in JP-B-61-28986 to provide a matting layer.

The surface of the substrate thus prepared was then observed by a scanning electron microscope (SEM) and an atomic force microscope (AFM) to evaluate the uniformity in grain. The external appearance of the substrate was then observed to evaluate the ununiformity and determine the number of streaky defects.

The surface of the aluminum web thus surface-treated was analyzed by an atomic force microscope (AFM). As a result, it was found that the grain thus formed comprises big corrugation having an average pitch of from not less than 5 μm to no t more than 30 μm on which middle corrugation comprising honeycomb pits having an average diameter of from not less than 0.5 μm to not more than 3 μm are superimposed.

As shown in Table 1 below, it can be seen that when the average surface roughness (Ra) determined by an atomic force microscope is from not less than 0.5 μm to not more than 1.0 μm and the proportion of the inclination angle of not less than 30 degrees in the distribution of surface inclination angles (a30) determined by an atomic force microscope is from not less than 5% to not more than 20%, a good support for printing plate can be obtained.

The atomic force microscope used in the measurement was SP13700 produced by Seiko Instrument Inc. In measurement, a 1 cm square aluminum specimen was set on a horizontal specimen table on a piezoelectric scanner. A cantilever was then allowed to approach the surface of the specimen. Once the cantilever reached a region where an interatomic force can act on, it was moved in each of X and Y directions to scan the surface of the specimen and pick up the surface irregularity as a piezoelectric displacement in Z direction. As the piezoelectric scanner there was used one which can scan over 150 μm in each of X and Y directions and 10 μm in Z direction. As the cantilever there was used SI-DF20 produced by NANOPOROBE CORP., which has a resonant frequency of from 120 kHz to 150 kHz and a spring constant of 12 to 20 N/m. The measurement was conducted in DFM mode (Dynamic Force Mode). The three-dimensional data thus obtained were then approximated by the least squares method to correct the slight inclination of the specimen and determine the reference surface.

In the measurement of the pitch of big corrugation, the average surface roughness and the angle of inclination, measurement was made on a 120 μm square area over four fields of view, i.e., on a 240 μm square area. The resolving power in each of X and Y directions was 1.9 μm, the resolving power in Z direction was 1 nm, and the scanning speed was 60 μm/sec. The pitch of the big corrugation was calculated by the frequency analysis of the three-dimensional data. The average surface roughness (Ra) was determined according to center line average roughness defined in JIS B0601 (1994) by extending to three-dimensional data. For the evaluation of the surface inclination, three adjoining points were extracted from the three-dimensional data. The angle of the minute triangle formed by the three points with the reference surface was calculated over all the data to determine a distribution of inclination angles from which the proportion of surfaces having an inclination angle of not less than 30 degrees was then determined.

For the evaluation of the pit diameter of the middle corrugation, measurement was made on a 25 μm square area over four fields of view, i.e., on a 50 μm square area. The resolving power in each of X and Y directions was 0.1 μm, the resolving power in Z direction was 1 nm, and the scanning speed was 25 μm/sec. The diameter of the pit was measured at the edge thereof.

The results of preparation and evaluation are set forth in Table 1.

TABLE 1

| Material | Dissolution by chemical etching ($g/m^2$) | Electrochemical roughening (electrolytic etching) Electrical quantity ($C/dm^2$) | Dissolution (calculated) | Grainability | External surface appearance | Streaky defect ($/m^2$) | a30 (%) | Remarks |
|---|---|---|---|---|---|---|---|---|
| Conventional | 4.0 | 155 | 1.45 | Good | Good | 0 | 20.3 | Ref. |
| Continuously casted | 4.0 | 155 | 1.45 | Fair | Fair | 50 | 21.0 | Compara. |
| Continuously casted | 4.0 | 200 | 1.86 | Good–fair | Good–fair | 10 | 16.7 | Invent. |
| Continuously casted | 4.0 | 230 | 2.14 | Good | Good | 0 | 15.0 | Invent. |
| Conventional | 5.5 | 110 | 0.93 | Good | Good | 0 | 19.2 | Ref. |
| Conventional | 5.5 | 155 | 1.45 | Good | Good | 0 | 18.2 | Ref. |
| Continuously casted | 5.5 | 110 | 0.93 | Fair–poor | Poor | 80 | 18.9 | Ref. |
| Continuously casted | 5.5 | 155 | 1.45 | Good–fair | Fair | 40 | 18.8 | Ref. |
| Continuously casted | 5.5 | 200 | 1.86 | Good | Good | 10 | 10.7 | Invent. |
| Continuously casted | 5.5 | 230 | 2.14 | Good | Good | 5 | 10.8 | Invent. |
| Continuously casted | 5.5 | 155 | 1.45 | Good–fair | Good–Fair | 40 | 20.1 | Compara.* |
| Continuously casted | 5.5 | 200 | 1.86 | Good | Good | 10 | 17.2 | Invent.* |
| Continuously casted | 5.5 | 230 | 2.14 | Good | Good | 5 | 17.7 | Invent.* |
| Continuously casted | 12.0 | 155 | 1.45 | Good–fair | Good–Fair | 30 | 18.4 | Ref. |

TABLE 1-continued

| Material | Dissolution by chemical etching (g/m²) | Electrochemical roughening (electrolytic etching) Electrical quantity (C/dm²) | Dissolution (calculated) | Grainability | External surface appearance | Streaky defect (/m²) | a30 (%) | Remarks |
|---|---|---|---|---|---|---|---|---|
| Continuously casted | 12.0 | 200 | 1.86 | Good | Good | 5 | 16.0 | Invent. |
| Continuously casted | 12.0 | 230 | 2.14 | Good | Good | 0 | 12.7 | Invent. |

*These samples were treated according to Surface treatment B and others were treated according to Surface treatment A.

The lowest allowable level of grainability and external surface appearance is "Good-fair". No streaky defects are preferable. However, the lowest allowable level is $10/m^2$.

The examples according to the present invention provided good results in all examples.

EXAMPLE 2

An aluminum web having a composition according to JIS A1050, a thickness of 0.24 mm and a width of 780 mm was subjected to a continuous treatment.

The mechanical roughening (a) was effected by means o f the apparatus shown in FIG. 1. A 20% suspension of siliceous sand having an average particle diameter of from 15 $\mu$m to 35 $\mu$m (common name: pumice stone) in water was used as an abrasive slurry 3. The aluminum web 1 was mechanically roughened by a rotating nylon brush roller 2 with supplying the abrasive slurry 3 onto the surface thereof. The nylon brush was made of 6•10 nylon. The bristle length was 90 mm. The nylon brush was prepared by making holes on a stainless steel cylinder having a diameter of 300 mm, and then densely plating the bristles on the cylinder. One rotary brush was used as the brush roller 2. The distance between the two supporting rollers 5 and 6 each having a diameter of 200 mm disposed under the brush roller 2 was 300 mm. The brush roller was pressed against the aluminum web 1 until the load on the driving motor for rotating the brush reached 10 kw plus the value before the pressing of the brush roller against the aluminum web 1.

In the chemical etching (b), the aluminum web 1 was spray-etched with an aqueous solution having a caustic soda concentration of 26% by weight and an aluminum ion concentration of 6.5% by weight at a liquid temperature of 75° C.

In the desmutting process (c), the aluminum web 1 was sprayed with a 1 wt % aqueous solution of nitric acid (containing 0.5% by weight of aluminum ions) at a liquid temperature of 30° C. (As the treatment liquid for this desmutting process (c), there was used the overflow waste liquid from the nitric acid electrolyte used in the following electrochemical roughening process (d).)

In the electrochemical roughening process (d), a 1 wt % aqueous solution of nitric acid (containing 0.5% by weight of aluminum ion) was used. The aluminum web 1 was electrochemically roughened with carbon electrodes disposed opposed thereto with a trapezoidal square alternating current having a frequency of 60 Hz, a duty ratio of 1:1 and TP (time required for current value to reach from zero to peak) of 2 msec. The current density as used in Example 1 was obtained by dividing the current integrated over one period of anodization of the aluminum web by time in the one period to thereby average. The electrical quantity is the sum of electrical quantity consumed during the anodization of the aluminum web 11. The ratio of the anodizing current density to the cathodizing current density on the aluminum web 11 disposed opposed to the main carbon electrodes 13 was 0.95:1.

In the chemical etching process (e), the aluminum web 11 was spray-etched with an aqueous solution having a caustic soda concentration of 26% by weight and an aluminum ion concentration of 6.5% by weight at a liquid temperature of 45° C.

The desmutting process (f) was effected in a 25 wt % aqueous solution containing 0.3% by weight of aluminum ions at a temperature of 60° C.

In the anodization process (g), the aluminum web 11 was anodized in a 15% aqueous solution of sulfuric-acid at a current density of 2 $A/dm^2$.

The aluminum web 11 which had been subjected to the foregoing treatments (a) to (g) in this order was dehydrated by a nip roller, and then rinsed. The aluminum web was not rinsed after desmutted in the process (c). Thus, the aluminum web had kept the desmutting solution wet and attached uniformly thereto until the process (d).

The substrate thus treated was dried, and then coated with the following undercoat solution.

As the undercoat solution there was used the following composition. The undercoat solution was applied to the substrate, and then dried with a 80° C. hot air for 30 seconds. The dried coated amount of the undercoat layer was 30 $mg/M^2$.

| | |
|---|---|
| Aminoethylphosphonic acid | 0.10 g |
| Phenylphosphonic acid | 0.15 g |
| β-Alanine | 0.10 g |
| Methanol | 40 g |
| Pure water | 60 g |

Thus, a substrate was prepared.

Then, the substrate was coated with the same photosensitive solution as used in Example 1, and then dried at a temperature of 110° C. for 1 minute to obtain a positive photosensitive lithographic printing plate. The dried coated amount of the photosensitive layer was 1.7 $g/m^2$.

Onto the photosensitive layer thus applied was then provided a matting layer in the same manner as in Example 1.

The photosensitive lithographic printing plate thus prepared was exposed to light from a 3 kw metal halide lamp disposed at a distance of 1 m from the printing plate through a transparent positive film in a vacuum frame for 50 seconds, and then passed through an automatic developing machine Stablon 900D produced by Fuji Photo Film Co., Ltd. filled with a 5.26% aqueous solution (pH 12.7) of sodium silicate having a $SiO_2/Na_2O$ molar ratio of 1.74 as a developer and FN-3 (1:7) produced by Fuji Photo Film Co., Ltd. as a rinsing solution.

The lithographic printing plate was then allowed to stand for 1 day. The lithographic printing plate was then evaluated for printing properties. As the printing machine there was used KOR-D available from Heidelberg Inc. As the fountain solution there was used EU-3 (1:100) available from Fuji Photo Film Co., Ltd. As the ink there was used Mark Five New Ink available from Toyo Ink Mfg. Co., Ltd.

The surface of the aluminum support thus surface-treated was then analyzed by an atomic force microscope (AFM). As a result, it was found that the grain thus formed comprises big corrugation having an average pitch of from not less than 5 μm to not more than 30 μm on which middle corrugation comprising honeycomb pits having an average diameter of from not less than 0.5 μm to not more than 3 μm are superimposed.

The surface of the surface-treated aluminum support was analyzed by an atomic force microscope (AFM) in the same manner as in Example 1.

As set forth in Table 2, it can be seen that when the average surface roughness (Ra) determined by an atomic force microscope is from not less than 0.5 μm to not more than 1.0 μm and the proportion of the inclination angle of not less than 30 degrees in the distribution of surface inclination angles (a30) determined by an atomic force microscope is from not less than 5% to not more than 20%, a good support for printing plate can be obtained. Accordingly, Sample Nos. 2-15 and 2-18 are comparative samples.

TABLE 2

| | | Sample Nos. | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| (a) Mechanical roughening | Bristle diameter (mm) | 0.72 | 0.72 | 0.72 | 0.72 | 0.72 | 0.72 | 0.72 | 0.72 | 0.72 |
| | Rotational speed (rpm) | 200 | 200 | 200 | 200 | 200 | 200 | 200 | 300 | 150 |
| | Consumed power (kW) | 10 | 10 | 10 | 10 | 10 | 10 | 10 | 10 | 10 |
| (b) Chemical etching | Dissolution ($g/m^2$) | 10 | 15 | 15 | 15 | 15 | 20 | 25 | 15 | 15 |
| (c) Desmutting | Dipping time (sec) | 10 | 10 | 10 | 10 | 10 | 10 | 10 | 10 | 10 |
| (d) Electro chemical roughening | Electrical quantity ($C/dm^2$) | 230 | 155 | 210 | 230 | 270 | 230 | 230 | 270 | 270 |
| | Current density ($A/dm^2$) | 27 | 18 | 25 | 27 | 32 | 27 | 27 | 32 | 32 |
| (e) Chemical etching | Dissolution ($g/m^2$) | 0.7 | 0.7 | 0.7 | 0.7 | 0.7 | 0.7 | 0.7 | 0.7 | 0.7 |
| (f) Desmutting | Dipping time (sec) | 10 | 10 | 10 | 10 | 10 | 10 | 10 | 10 | 10 |
| (g) Anodization | Anodized amount ($g/m^2$) | 1.6 | 1.6 | 1.6 | 1.6 | 1.6 | 1.6 | 1.6 | 1.6 | 1.6 |
| Physical properties | a30 (%) | 17.7 | 13.2 | 9.9 | 12.7 | 13.0 | 11.5 | 13.3 | 14.3 | 11.7 |
| | Ra (μm) | 0.89 | 0.86 | 0.81 | 0.78 | 0.8 | 0.8 | 0.82 | 0.81 | 0.78 |
| Stain-proofness | Non-dot image area | A | A | A | A | A | A | A | A | A |
| | Blanket | B | B | B | A | B | A | B | B | A |
| Printing durability (× 10,000) | | 5 | 5 | 5 | 5 | 5 | 5 | 5 | 5 | 5 |
| Total evaluation | | B | B | B | A | B | A | B | B | A |

| | | Sample Nos. | | | | | | | | |
|---|---|---|---|---|---|---|---|---|---|---|
| | | 2-10 | 2-11 | 2-12 | 2-13 | 2-14 | 2-15 | 2-16 | 2-17 | 2-18 |
| (a) Mechanical roughening | Bristle diameter (mm) | 0.59 | 0.59 | 0.59 | 0.48 | 0.3 | 0.3 | 0.3 | 0.3 | — |
| | Rotational speed (rpm) | 200 | 200 | 200 | 200 | 200 | 200 | 200 | 300 | — |
| | Consumed power (kW) | 10 | 10 | 10 | 10 | 10 | 10 | 10 | 10 | — |
| (b) Chemical etching | Dissolution ($g/m^2$) | 15 | 15 | 15 | 15 | 15 | 15 | 15 | 5 | 15 |
| (c) Desmutting | Dipping time (sec) | 10 | 10 | 10 | 10 | 10 | 10 | 10 | 10 | 10 |
| (d) Electro chemical roughening | Electrical quantity ($C/dm^2$) | 230 | 195 | 270 | 230 | 230 | 230 | 230 | 230 | 155 |
| | Current density ($A/dm^2$) | 27 | 23 | 32 | 27 | 27 | 27 | 27 | 27 | 18 |
| (e) Chemical etching | Dissolution ($g/m^2$) | 0.7 | 0.7 | 0.7 | 0.7 | 0.7 | 0 | 1.2 | 0.7 | 0.7 |
| (f) Desmutting | Dipping time (sec) | 10 | 10 | 10 | 10 | 10 | 10 | 10 | 10 | 10 |
| (g) Anodization | Anodized amount ($g/m^2$) | 1.6 | 1.6 | 1.6 | 1.6 | 1.6 | 1.6 | 1.6 | 1.6 | 1.6 |
| Physical properties | a30 (%) | 9.5 | 9.8 | 11.4 | 12.4 | 11.1 | 20.3 | 9.6 | 10.8 | 4.8 |
| | Ra (μm) | 0.65 | 0.63 | 0.66 | 0.73 | 0.55 | 0.6 | 0.55 | 0.52 | 0.32 |
| Stain-proofness | Non-dot image area | A | A | A | A | A | B | B | B | C |
| | Blanket | A | B | A | A | A | C | A | A | A |
| Printing durability (× 10,000) | | 6 | 6 | 6 | 6 | 6 | 6 | 6 | 6 | 6 |
| Total evaluation | | A | A | A | A | A | C | B | B | C |

(Evaluation)
A: Excellent;
B: Good;
C: Fair
A and B are desirable levels.

EXAMPLE 3

The same aluminum web used in Example 2 was treated in the same manner as in Example 2 except that the frequency of the power supply and the time required for current to reach from zero to peak in the trapezoidal current waveform were changed as shown in Table 3. The aluminum web thus treated was coated with an undercoat solution and a photosensitive layer, exposed to light, developed, and then evaluated for printing properties. The results are set forth in Table 3. The optimum frequency of the alternating current in the electrolytic roughening was from 50 Hz to 70 Hz. The optimum TP was from 1 msec to 3 msec. Sample Nos. 3-1 and 3-6 to 3-10 were comparative samples.

TABLE 3

| | Sample Nos. | | | | | | | | | |
|---|---|---|---|---|---|---|---|---|---|---|
| | 3-1 | 3-2 | 3-3 | 3-4 | 3-5 | 3-6 | 3-7 | 3-8 | 3-9 | 3-10 |
| Power supply frequency (Hz) | 40 | 50 | 60 | 60 | 60 | 60 | 60 | 70 | 120 | 60 |
| Waveform | Trapezoidal | " | " | " | " | " | " | " | " | Sinusoidal |
| TP (msec) | 3 | 3 | 3 | 2 | 1 | 0 | 5 | 5 | 3 | — |
| Evaluation | | | | | | | | | | |
| Chatter mark | C | A | A | A | A–B | C | A | A | A | A |
| Stain on blanket | A | A | A | A | A | A | B–C | B–C | B | B–C |
| Dot stain | A | A | A | A | A | A | A | A | A | A |
| Carbon dissolution* | Yes | No | No | No | No | No | No | No | No | No |
| Total evaluation | C | A | A | A | A | C | C | C | A | C |

*"Yes" represents that the dissolution of carbon was observed.
"No" represents that the dissolution of carbon was not observed.
(Evaluation)
A: Excellent;
B: Good;
C: Fair
A or B is desirable level. Carbon is preferably insoluble.

EXAMPLE 4

The same aluminum web used in Example 2 was subjected to treatment, coating and evaluation in the same manner as in Example 2 except that aluminum hydroxide was used as an abrasive. The use of aluminum hydroxide as an abrasive provided printing properties of one grade higher than when siliceous sand is used. Furthermore, the use of aluminum hydroxide as an abrasive makes it possible to reduce the chemically-etched amount after mechanical roughening. The results are set forth in Table 4.

TABLE 4

| | | Sample Nos. | | |
|---|---|---|---|---|
| | | 4-1 | 4-2 | 4-3 |
| (a) Mechanical roughening | Abrasive | $Al(OH)_3$ | " | " |
| | Bristle diameter (mm) | 0.72 | 0.72 | 0.72 |
| | Rotational speed (rpm) | 200 | 200 | 200 |
| | Consumed power (kW) | 10 | 10 | 10 |
| (b) Chemical etching | Dissolution ($g/m^2$) | 15 | 15 | 4 |
| (c) Desmutting | Dipping time (sec) | 10 | 10 | 10 |
| (d) Electro-chemical roughening | Electrical quantity ($C/dm^2$) | 230 | 300 | 300 |
| | Current density ($A/dm^2$) | 27 | 35 | 35 |

TABLE 4-continued

| | | Sample Nos. | | |
|---|---|---|---|---|
| | | 4-1 | 4-2 | 4-3 |
| (e) Chemical etching | Dissolution ($g/m^2$) | 0.7 | 0.7 | 0.7 |
| (f) Desmutting | Dipping time (sec) | 10 | 10 | 10 |
| (g) Anodization | Anodized amount ($g/m^2$) | 1.6 | 1.6 | 1.6 |
| Physical properties | a30 (%) | 11.4 | 14.6 | 15.4 |
| | Ra (μm) | 0.75 | 0.85 | 0.87 |
| Stain- | Non-dot image area | A | A | A |

TABLE 4-continued

| | | Sample Nos. | | |
|---|---|---|---|---|
| | | 4-1 | 4-2 | 4-3 |
| proofness | Blanket | A | A | A |
| Printing durability (× 10,000) | | 5 | 5 | 5 |
| Total evaluation | | A | A | A |

(Evaluation)
A: Excellent;
B: Good;
C: Fair
A and B are desirable levels.

EXAMPLE 5

As shown in FIG. 3, the apparatus for use in the electrochemical roughening was an electrochemical roughening apparatus which comprises a radial electrolytic cell for the continuous electrolysis of a metal web with an electric current supplied through an electrolyte, said radial electrolytic cell being arranged such that a current is shunted through rectifying elements or switching elements 19*a*, 19*b* as a direct current to an auxiliary anode 18 provided in a cell other than the cell that has the two main electrodes 13*a*, 13*b* to control the ratio of the current value contributing to the anode current acting on the surface of the aluminum web 11 opposed to the main electrodes 13*a*, 13*b* to the current value contributing to the cathode reaction.

In this manner, the aluminum web 11 prepared from the same aluminum as used in Example 2 was subjected to continuous electrochemical roughening. As a result, the dissolution amount of the ferrite electrode 21 of the auxiliary anode 18 was slight, and continuous operation was achieved without dissolving the carbon electrode of the main electrodes 13*a*, 13*b*. The conditions of the pre-treatment and post-treatment for the electrochemical roughening process and the electrochemical roughening conditions were the same as in Example 2.

Comparative Example 1

Continuous electrochemical roughening was conducted in the same manner as in Example 5 except that the auxiliary anode 18 was provided in the same electrolytic cell as with the main electrodes 13*a*, 13*b*. The dissolution of the ferrite electrode 21 of the auxiliary anode 18 was remarkable as compared with Example 5.

EXAMPLE 6

Two sets of the same electrolytic cell as used in Example 5 were juxtaposed as shown in FIG. 4 to effect electrolysis. In order to form an auxiliary anode 18, ferrite electrodes 21 as shown in FIG. 6 were arranged as shown in FIG. 9 (*a*) for Example 6-1, as shown in FIG. 9 (*b*) for Example 6-2, and as shown in FIG. 9 (*c*) for Comparative Example 6-1. In Examples 6-1 and 6-2, the electrodes of FIG. 6 were arranged butted to each other as shown in FIGS. 9 (*a*) and 9 (*c*). In the electrode of FIG. 9 (*b*), the electrode of FIG. 7 was used, and electric power was supplied from both sides of the electrode. The dimension of the 1st cell and 2nd cell and the electrolysis conditions were quite the same in all the examples. The electrolytic power supply 20 provided a trapezoidal wave current having a duty ratio of 1:1, a frequency of 60 Hz and TP of 3 msec. The current density was 53 $A/dm^2$ at the peak of the trapezoidal wave. During the period between the time at which the aluminum web 11 enters the entrance of the 1st electrolytic cell and the time at which it passes through the exit of the 2nd electrolytic cell, the electrical quantity for anodization of the aluminum web was 115 $C/dm^2$ each for the 1st cell and 2nd cell, totalling 230 $C/dM^2$. The aluminum web moved at a rate of 66 m/min. The gap between the main carbon electrodes 13*a* and 13*b* was 500 mm.

The diameter of the radial drum roller 12 was 2,000 mm, and the clearance between the carbon electrode and the aluminum web was 10 mm. The total length of the carbon electrode in the moving direction of the aluminum web 11 was 2,400 mm each for the main electrodes 13*a* and 13*b*. Carbon electrodes having a length of 100 mm were arranged with a vinyl chloride insulator having a length of 5 mm provided interposed therebetween to form one electrode. The main carbon electrodes 13*a* and 13*b* were each triangularly notched at the head end thereof over a length of 300 mm to form a soft start zone. The thickness of the main carbon electrodes 13*a* and 13*b* was 100 mm. The electrolyte was supplied into the cells 15*a* and 15*b* through its respective electrolyte intake port at a rate of 1,500 l/min and 1,000 l/min, respectively. The composition of the electrolyte was a 2% aqueous solution of nitric acid (containing 0.5% by weight of aluminum ion). The liquid temperature was 50° C. The width of the aluminum web was 1,000 mm, and the width of the electrolytic cell was 1,600 mm.

In order to form the auxiliary anode 18, 20 anodes having a diameter of 28 mm were arranged in parallel at an interval of 5 mm each for the 1st and 2nd cells. The gap between the aluminum web 11 and the ferrite electrode 21 was 15 mm. A current which had been converted to pulse through the thyristors 19*a* and 19*b* was passed to the auxiliary anode 18. Into the electrolytic cells 50 and 51 having the auxiliary anode 18 provided therein were each supplied the electrolyte at a rate of 500 l/min. The quantity of electricity supplied from the auxiliary anode 18 to the aluminum web 11 was 10 $C/dm^2$ each for the 1st and 2nd cells, totalling 20 $C/dm^2$. The results of the observation of the surface of the aluminum web 11 which had passed through the 2nd cell are given below.

| | Width of packing or clearance of butted portion | Uneven treatment |
|---|---|---|
| EXAMPLE 6-1 | 0–1 mm | A–B |
| EXAMPLE 6-2 | 1 mm | A |
| COMPARATIVE EXAMPLE 6-1 | 0–1 mm | B–C |

Evaluation:
A: no uneven treatment;
B: little uneven treatment;
C: some uneven treatment As mentioned above, the present invention can produce a support for photosensitive lithographic printing plate having a uniform treated and roughened surface which provides excellent printing properties from an aluminum web which has been obtained by continuous cast-rolling that can advantageously simplify the production process and reduce the production cost as compared with the conventional process. The examples of the present invention provided excellent results in all properties.

Furthermore, in accordance with the present invention, a support for lithographic printing plate which is insusceptible to staining on the image shadow area and on the blanket and exhibits a good adhesion property to the photosensitive layer can be obtained.

While the invention has been described in detail and with reference to specific examples thereof, it will be apparent to one skilled in the art that various changes and modifications can be made therein without departing from the spirit and scope thereof.

What is claimed is:

1. A support for a lithographic printing plate having a corrugated surface processed by roughening, wherein:

said corrugation on the support surface comprises big corrugation having an average pitch of from not less than 5 $\mu$m to not more than 30 $\mu$m, and middle corrugation superimposed on said big corrugation, said middle corrugation comprising honeycomb pits having an average diameter of from not less than 0.5 $\mu$m to not more than 3.0 $\mu$m; and said support surface has a surface inclination distribution which comprises an inclination of not less than 30 degrees in a proportion of from not less than 5% to not more than 20% as determined by an atomic force microscope.

2. The support for a lithographic printing plate as claimed in claim 1, wherein said support surface has an average surface roughness of from not less than 0.5 $\mu$m to not more than 1.0 $\mu$m as determined by an atomic force microscope.

* * * * *